(12) United States Patent
Hayashi et al.

(10) Patent No.: US 7,226,197 B2
(45) Date of Patent: Jun. 5, 2007

(54) SURFACE LIGHT SOURCE DEVICE AND LIGHT GUIDE USED THEREFOR

(75) Inventors: Yasuko Hayashi, Kanagawa (JP); Tomoyoshi Yamashita, Kanagawa (JP)

(73) Assignee: Mitsubishi Rayon Co., Ltd., Tokyo (JP)

(*) Notice: Subject to any disclaimer, the term of this patent is extended or adjusted under 35 U.S.C. 154(b) by 62 days.

(21) Appl. No.: 10/511,983

(22) PCT Filed: Apr. 22, 2003

(86) PCT No.: PCT/JP03/05088

§ 371 (c)(1),
(2), (4) Date: Oct. 21, 2004

(87) PCT Pub. No.: WO03/089839

PCT Pub. Date: Oct. 30, 2003

(65) Prior Publication Data
US 2005/0174803 A1 Aug. 11, 2005

(30) Foreign Application Priority Data
Apr. 22, 2002 (JP) .............................. 2002-119807

(51) Int. Cl.
*F21V 8/00* (2006.01)

(52) U.S. Cl. ...................... 362/608; 362/330; 362/331; 362/339

(58) Field of Classification Search ............... 362/608, 362/330, 339, 331
See application file for complete search history.

(56) References Cited

U.S. PATENT DOCUMENTS 5,001,609 A * 3/1991 Gardner et al. ............. 362/555
5,854,872 A * 12/1998 Tai .............................. 385/133
6,371,623 B1 * 4/2002 Toyoda ....................... 362/608
6,384,881 B1 * 5/2002 Arai et al. .................... 349/65
6,607,281 B2 * 8/2003 Ono et al. .................. 362/604
6,799,859 B1 * 10/2004 Ida et al. ..................... 362/26
2002/0006036 A1 * 1/2002 Egawa et al. ................ 362/31

FOREIGN PATENT DOCUMENTS

JP  5-6401 U   1/1993
JP  7-27137 B2  3/1995

(Continued)

*Primary Examiner*—Renee Luebke
*Assistant Examiner*—Mary Zettl
(74) *Attorney, Agent, or Firm*—Morgan, Lewis & Bockius LLP

(57) ABSTRACT

A light guide which guides light emitted from an LED includes a light incident end surface for receiving light, a light outputting surface for outputting a guided light, and a lens forming surface that has a plurality of elongated lenses arranged in parallel to each other and formed along the directivity of light incident from the LED, such that a plurality of micro regions are defined over the plurality of elongated lens. In the vicinity of the LED, a distribution of micro regions having an inclination angle between 20° and 50° is at least 10% over all micro regions. A light deflection element disposed adjacent to the light guide light outputting surface includes a light entrance surface having a plurality of lenses formed thereon that are parallel to each other and extend in a direction parallel to the light guide light incident end surface.

47 Claims, 16 Drawing Sheets

FOREIGN PATENT DOCUMENTS

| | | |
|---|---|---|
| JP | 7-270624 A | 10/1995 |
| JP | 8-179322 A | 7/1996 |
| JP | 9-160035 A | 6/1997 |
| JP | 11-52380 A | 2/1999 |
| JP | 11-287993 A | 10/1999 |
| JP | 2000-98382 A | 7/2000 |
| JP | 2000-294019 A | 10/2000 |
| JP | 2001-66590 A | 3/2001 |
| JP | 2002-46159 | 2/2002 |

* cited by examiner

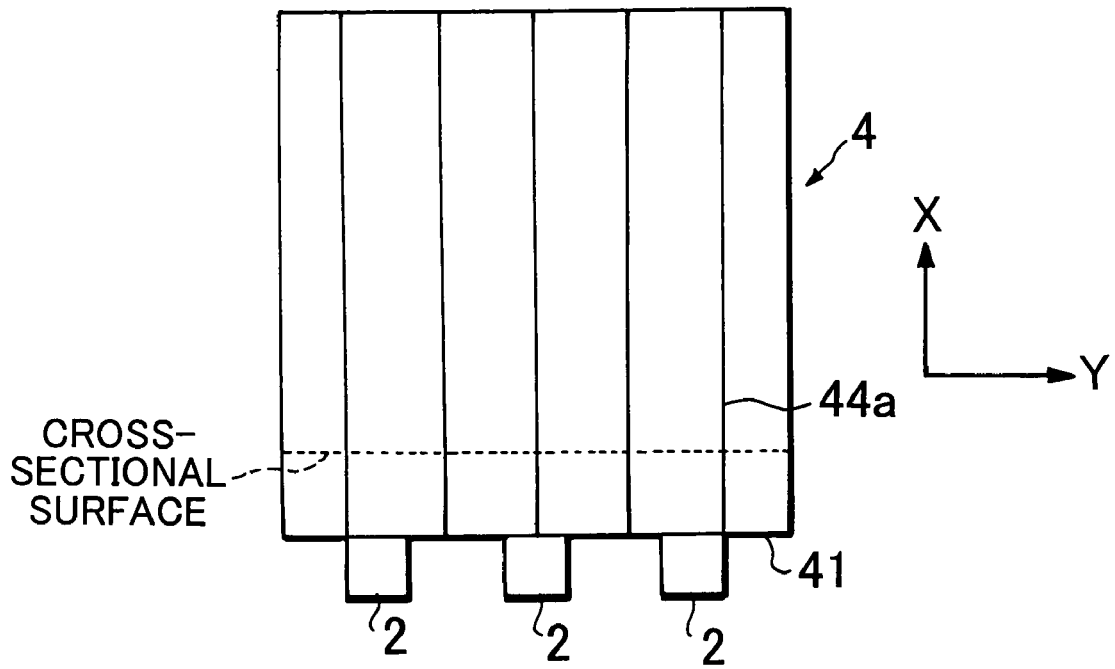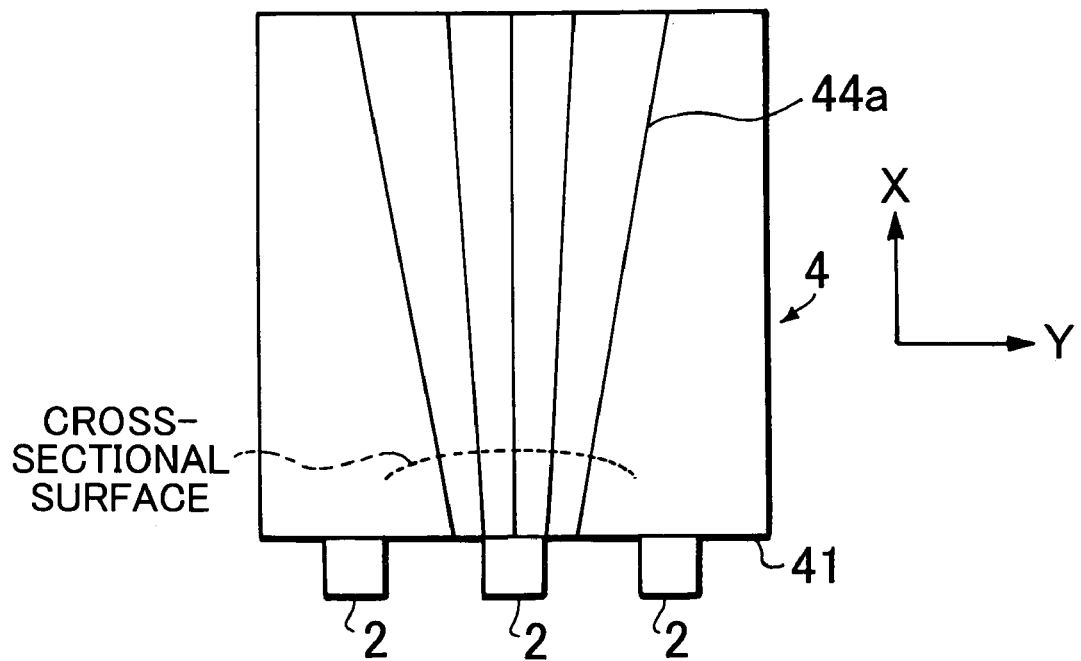

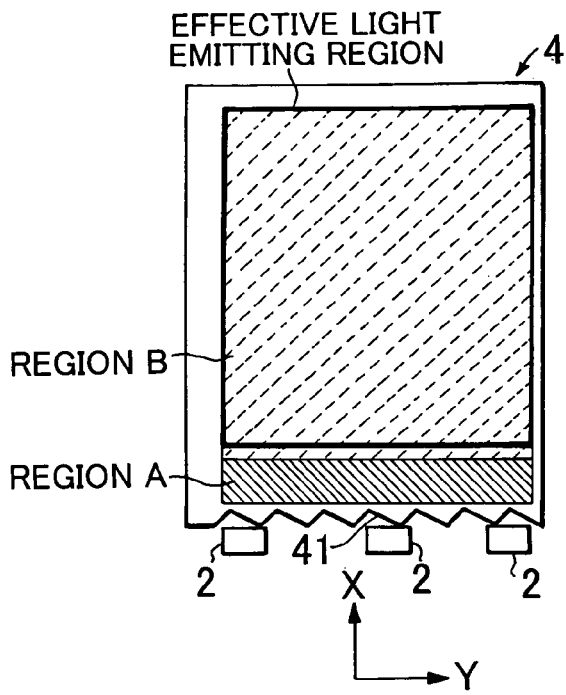
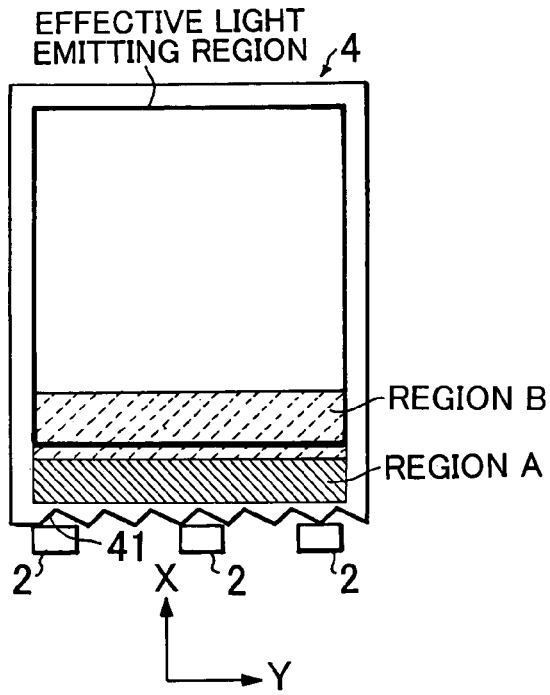
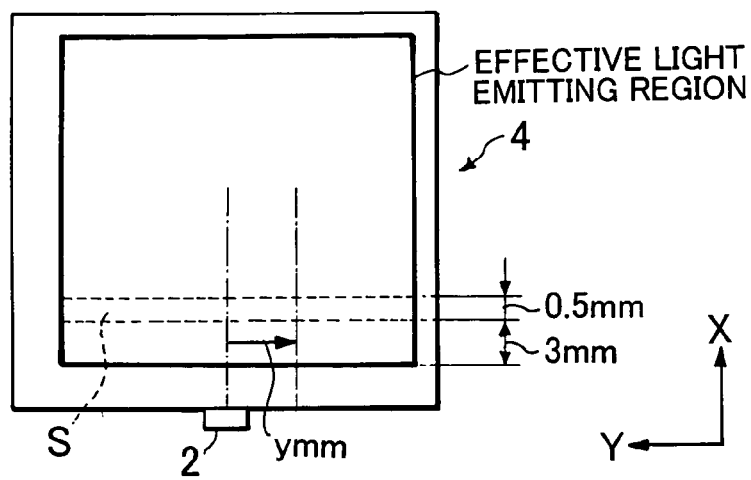

EFFECTIVE LIGHT EMITTING REGION

NECESSARY SPREAD ANGLE: $\theta$

EFFECTIVE LIGHT EMITTING REGION

REGION B

REGION A

FIG.16
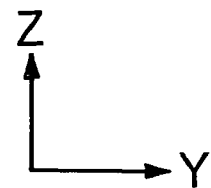
FIG.17
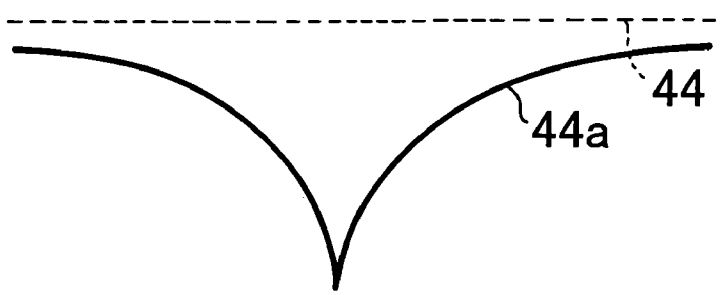
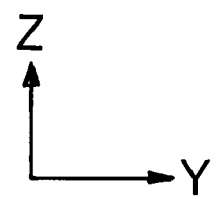
FIG.18
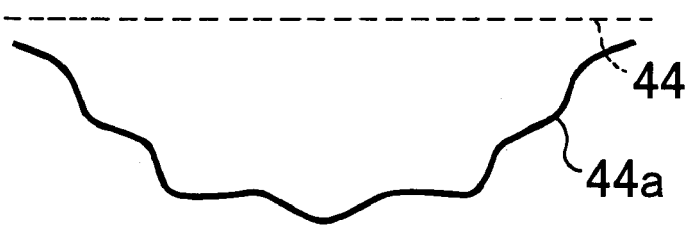
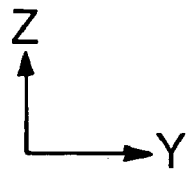
FIG.19
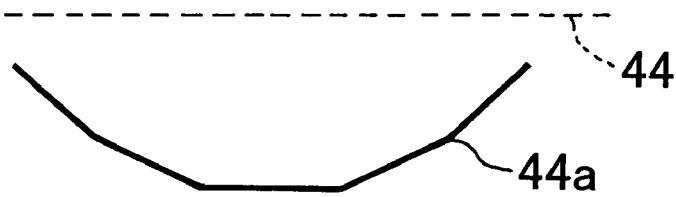
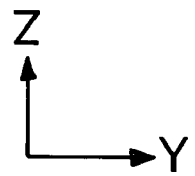
FIG.20
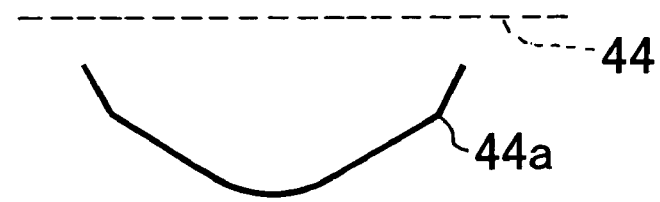
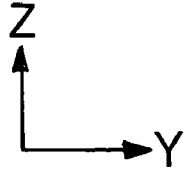

EFFECTIVE LIGHT EMITTING REGION

SURFACE LIGHT SOURCE DEVICE AND LIGHT GUIDE USED THEREFOR

TECHNICAL FIELD

The present invention relates to a surface light source device of an edge light system, particularly to a surface light source device in which miniaturization and power consumption reduction are intended. The surface light source device is preferably applied, for example, to a backlight of a comparatively small liquid crystal display device for use as a display panel of a portable electronic device such as a cellular phone, and an indicator for various types of apparatuses.

BACKGROUND ART

In recent years, liquid crystal display devices have been broadly used as monitors of notebook-size portable computers and the like, or display sections of liquid crystal television sets or video integrated liquid crystal television sets, and further in other various fields. Each liquid crystal display device basically comprises: a backlight section; and a liquid crystal display element section. For the backlight section, an edge light system has been frequently used from a viewpoint of reduction in size of the liquid crystal display device. As a backlight, a system has heretofore been broadly used in which at least one end surface of a light guide having a rectangular plate shape is used as a light incident end surface, a linear or rod-shaped primary light source such as a straight tube type fluorescent lamp or the like is disposed along the light incident end surface, light emitted from the primary light source is introduced into the light guide via the light incident end surface of the light guide, and the light is output from a light outputting surface that is one of two main surfaces of the light guide.

This backlight has a problem that a sufficient quantity of light does not reach light guide corner portions in the vicinity of opposite end portions of the linear or rod-shaped primary light source, or regions of the light guide in the vicinity of side end surfaces of the light guide adjacent to the light incident end surface, and luminance easily drops in these portions or regions.

Additionally, in recent years, there has been a demand for miniaturization and reduction of power consumption with respect to a liquid crystal display device having a comparatively small screen dimension, for portable electronic apparatuses such as a cellular phone and a portable game machine, or indicators of various types of electric or electronic apparatuses. Therefore, a light emitting diode (LED) which is a point light source has been used as the primary light source of the backlight in order to reduce power consumption. In the backlight using the LED as the primary light source, a plurality of LEDs are one-dimensionally or linearly arranged along the light incident end surface of the light guide in order to exert a function similar to that of a backlight using a linear primary light source as described, for example, in JP(A)-7-270624. By the use of the primary light source by the one-dimensional arrangement of a plurality of LEDs in this manner, a desired quantity of light, and uniformity of a luminance distribution over the whole screen can be obtained.

However, in the small-sized liquid crystal display device, there has been a further demand for further reduction of the power consumption, and the number of LEDs for use needs to be reduced in order to meet the demand. However, when the number of LEDs is reduced, a distance between light emitting points lengthens, therefore a region of the light guide in the vicinity of the region between the adjacent light emitting points is enlarged, and intensity of light output in a desired direction from the light guide region drops. This brings about disproportionateness (i.e., brightness unevenness) of the luminance distribution of an observation direction in a light emitting surface of the surface light source device.

Moreover, in JP(B)-7-27137, a method has been proposed in which a light guide having a rough light outputting surface is used, a prism sheet having a large number of elongated prisms is disposed on the light outputting surface of the light guide in such a manner as to dispose a prism surface on a light guide side, and a distribution of the output light is narrowed in order to suppress the power consumption of the backlight and not to sacrifice the luminance as much as possible. In this backlight, although a high luminance is obtained with low power consumption, brightness unevenness is easily visually recognized through the prism sheet.

A most important problem in the brightness unevenness is a dark shadow part (dark part) generated in a light guide region corresponding to the outside of opposite-end LEDs 2 in the arrangement of a plurality of LEDs, or between the adjacent LEDs 2 as shown in FIG. 27. An actual generation example is shown in FIG. 28. When an area of this dark part is large, and the part is visually recognized even in an effective light emitting region of the backlight corresponding to a display screen of the liquid crystal display device, quality level of the backlight largely drops. Especially when the number of LEDs for use is decreased in order to reduce the power consumption, or when a distance between the LED and the effective light emitting region is reduced in order to reduce size of the device, the dark part is easily visually recognized in the effective light emitting region. As a cause of the brightness unevenness, the light emitted from individual LEDs arranged adjacent to the light incident end surface of the light guide has directivity, and further the spread of the light which has entered the light guide becomes comparatively narrow by a refraction function at a time when the light enters the light guide. Furthermore, since the only light going substantially perpendicular to a direction of the elongated prism of the prism sheet is observed in a normal direction of the light outputting surface, the spread of the observed light becomes smaller than that of the light actually output from the light guide. Thus, it has been difficult to establish both the reduction of the power consumption and maintenance of the uniformity of the luminance distribution in the conventional backlight using the point light source as the primary light source.

Further as a method of eliminating the dark part in the vicinity of an incidence surface in the backlight using a linear light source such as a cold cathode tube as the primary light source, for example, in JP(A)-9-160035, a method of roughening the light incident end surface of the light guide has been proposed, but the above-described dark part cannot be sufficiently eliminated in the backlight using the point light source like the LED as the primary light source in this method.

On the other hand, in JP(U)-5-6401 or JP(A)-8-179322, the backlight using the linear light source like the cold cathode tube has been proposed in which a large number of elongated prisms extending in parallel to each other in the direction substantially perpendicular to the light incident end surface are formed on the light outputting surface of the light guide or a back surface thereof for a purpose of converging the output light from the light guide in a plane parallel to the light incident surface. In the light guide in which the elongated prisms are formed, the light introduced into the light guide is directed in a direction in which an inclination angle with respect to the direction of the incident light enlarges or is further returned toward the direction of the incident light by reflection by the elongated prisms of the light guide. Therefore, a travel direction of the light which has entered the light guide is converged in a direction in which the elongated prism extends, and it is therefore possible to enhance luminance. In application of the light guide to the backlight using the LED, the light introduced into the light guide spreads with respect to the direction of the incident light by the reflection by the elongated prism of the light guide, the spread light is output in a direction substantially perpendicular to the elongated prism of the prism sheet, and therefore the distribution of the light seen through the prism sheet appears to spread.

However, when the elongated prism having a cross-sectional shape constituted of a linear portion is formed in the light guide, the light is spread with anisotropy in a specific direction, and therefore bright streaked brightness unevenness is generated in oblique directions as shown in FIG. 29. An actual generation example is shown in FIG. 28. As shown in FIG. 30, generation of the brightness unevenness is seen because the luminance increases in a portion in which the lights output from the respective point light sources are superimposed. An actual generation example is shown in FIG. 31.

Furthermore, when the light incident end surface is roughened as described above in order to eliminate a dark region between the primary light sources or in the corner portion, the dark region is reduced. However, as shown in FIG. 32, bright streaked brightness unevenness is further remarkably observed in oblique directions. An actual generation example is shown in FIG. 33.

DISCLOSURE OF THE INVENTION

An object of the present invention is to eliminate various brightness unevenness caused by use of the small number of point primary light sources for reduction of power consumption of the above-described surface light source device and to provide a surface light source device having a high quality level.

In order to attain the above object, according to the present invention, there is provided a light guide for a surface light source device, having a plate-like shape, which guides light emitted from a point primary light source and which has a light incident end surface for receiving the light from the primary light source and a light outputting surface for outputting the guided light, wherein a plurality of elongated concave/convex structures extending substantially along a direction of directivity of the light which has entered the light guide in a plane along the light outputting surface and arranged substantially in parallel to each other are formed on one of the light outputting surface and a back surface on an opposite side and, at least in the vicinity of the primary light source, a shape of a section of the plurality of elongated concave/convex structures in a plane perpendicular to extending directions thereof is such that an existence proportion of angle components of 20° or more and 50° or less of an absolute value of an inclination angle formed by a tangent in each micro area with an elongated concave/convex structure forming surface is 10% or more.

In an aspect of the present invention, each of the elongated concave/convex structures is elongated lens, and the plurality of elongated concave/convex structures are constituted of a plurality of repeatedly arranged elongated lenses having substantially the same shape. In an aspect of the present invention, a part or all of the surface of each of the elongated concave/convex structures is roughened.

In an aspect of the present invention, the existence proportion of angle components of $\alpha°$ or more and $\alpha°+10°$ or less in the absolute value of the inclination angle is 60% or less with respect to all angles $\alpha°$ of 0° or more and 80° or less at least in the vicinity of the primary light source.

In an aspect of the present invention, the elongated concave/convex structure forming surface has a region A which is positioned in the vicinity of the primary light source and in which the elongated concave/convex structures are formed, and a region B which is positioned in the vicinity of the region A and in which the elongated concave/convex structures are formed, and a sectional shape of the region A is different from that of the region B.

In an aspect of the present invention, the existence proportion of angle components of 30° or more and 50° or less in the absolute value of the inclination angle in the region B is smaller than that in the region A. In an aspect of the present invention, a valley portion inclination angle of the elongated concave/convex structures formed in the region B is smaller than that of the elongated concave/convex structures formed in the region A. In an aspect of the present invention, a shape of the elongated concave/convex structures formed in the region B gradually changes depending on a position. In an aspect of the present invention, the region B is formed in a part or all of an end portion of an effective light emitting region in the vicinity of the primary light source. In an aspect of the present invention, substantially all of the elongated concave/convex structure forming surface except the region A is the region B. In an aspect of the present invention, the region B is formed in a band shape. In an aspect of the present invention, the region B is formed in an island shape.

In an aspect of the present invention, the existence proportion of angle components of 35° or more and 60° or less in the absolute value of the inclination angle is 4% or more and 55% or less, or the existence proportion of angle components of 15° or less in the absolute value of the inclination angle is 25% or more and 85% or less at least in the vicinity of the primary light source.

In an aspect of the present invention, the sectional shape of all or a part of the elongated concave/convex structures is constituted of an outwardly convex curved line. In an aspect of the present invention, the sectional shape of all or a part of the elongated concave/convex structure is constituted of an outwardly concave curved line. In an aspect of the present invention, the sectional shape of all or a part of the elongated concave/convex structure is constituted of a curved line having an outwardly convex region and an outward concave region. In an aspect of the present invention, the sectional shape of all or a part of the elongated concave/convex structure is a substantially polygonal shape. In an aspect of the present invention, the sectional shape of all or a part of the elongated concave/convex structure has a shape in which a straight line is combined with a curved line.

In an aspect of the present invention, in the elongated concave/convex structure forming surface, a first region in which the elongated concave/convex structures each having curved line shape as the sectional shape are arranged is formed in the vicinity of the primary light source, and a second region in which the elongated concave/convex structures each having substantially polygonal shapes as the sectional shapes are arranged is formed adjacent to the first region.

In an aspect of the present invention, a maximum value of the existence proportion of angle components of $\alpha°$ or more and $\alpha°+10°$ or less in the absolute value of the inclination angle obtained with respect to all angles $\alpha°$ of 0° or more and 80° or less in the second region is larger than that in the first region.

In an aspect of the present invention, the elongated concave/convex structure forming surface is one obtained in such a manner that a part or all of an elongated concave/convex structure shape transfer surface of a mold is blasted, and the elongated concave/convex structure shape transfer surface is transferred by forming using the mold. In an aspect of the present invention, the elongated concave/convex structure forming surface is one obtained in such a manner that a part or all of an elongated concave/convex structure shape transfer surface of a mold is polished, and the elongated concave/convex structure shape transfer surface is transferred by forming using the mold. In an aspect of the present invention, the elongated concave/convex structure forming surface is one obtained in such a manner that a part or all of a elongated concave/convex structure shape transfer surface of a mold is etched, and the elongated concave/convex structure shape transfer surface is transferred by forming using the mold. In an aspect of the present invention, the elongated concave/convex structure forming surface has a blast trace in a part or all thereof. In an aspect of the present invention, the elongated concave/convex structure forming surface is one obtained in such a manner that a first elongated concave/convex structure shape transfer surface is transferred by forming using a first mold having the first elongated concave/convex structure shape transfer surface to obtain a formed material, the surface obtained by blasting a part or all of the surface of the formed material corresponding to the first elongated concave/convex structure shape transfer surface is transferred to obtain a second mold having a second elongated concave/convex structure shape transfer surface, and the second elongated concave/convex structure shape transfer surface is transferred by the forming using the second mold.

In an aspect of the present invention, the light incident end surface is constituted of an anisotropic rough surface, and an average inclination angle of the anisotropic rough surface in a direction along the light outputting surface is larger than that in a direction perpendicular to the light outputting surface. In an aspect of the present invention, in the anisotropic rough surface, the average inclination angle in the direction along the light outputting surface is 3° to 30°, and the average inclination angle in the direction perpendicular to the light outputting surface is 5° or less. In an aspect of the present invention, in the anisotropic rough surface, a length of a region having an inclination angle of 8° or more with respect to an anisotropic rough surface forming surface in measurement in a direction perpendicular to the light outputting surface is 5% or less of a total measured length. In an aspect of the present invention, in the anisotropic rough surface, the surface of an elongated lens extending in a direction perpendicular to the light outputting surface is roughened.

In an aspect of the present invention, a light outputting functional structure is disposed in at least one of the light outputting surface and the back surface and/or inside the light guide. In an aspect of the present invention, the light outputting functional structure comprises a rough surface or a plurality of substantially mutually parallel elongated lenses formed on at least one of the light outputting surface and the back surface, and the elongated lenses substantially extend in a direction of directivity of light which has entered the light guide or a direction perpendicular to the direction of directivity of light. In an aspect of the present invention, an average inclination angle of the plurality of elongated lenses is 0.2° to 20° in the direction of the directivity of the light which has entered the light guide. In an aspect of the present invention, the surfaces of the plurality of elongated lenses are roughened. In an aspect of the present invention, the light outputting functional structure comprises a component in the light guide, whose refractive index is different from that of a main component of the light guide inside.

In an aspect of the present invention, a necessary light spread angle is 100° or more and a region in which the existence proportion of angle components of 30° or more and 50° or less in the absolute value of the inclination angle is 10% or more is formed substantially in all of a region from the light incident end surface to an effective light emitting region in the elongated concave/convex structure forming surface. In an aspect of the present invention, a necessary light spread angle is 90° or more and a region in which the existence proportion of angle components of 25° or more and 50° or less in the absolute value of the inclination angle is 20% or more is formed in a part or all of a region from the light incident end surface to an effective light emitting region in the elongated concave/convex structure forming surface. In an aspect of the present invention, a necessary light spread angle is 80° or more and a region in which the existence proportion of angle components of 25° or more and 50° or less in the absolute value of the inclination angle is 10% or more is formed in a part or all of a region from the light incident end surface to an effective light emitting region in the elongated concave/convex structure forming surface. In an aspect of the present invention, a necessary light spread angle is 70° or more and a region in which the existence proportion of angle components of 20° or more and 50° or less in the absolute value of the inclination angle is 10% or more is formed in a part or all of a region from the light incident end surface to an effective light emitting region in the elongated concave/convex structure forming surface.

In an aspect of the present invention, a plurality of obliquely elongated lenses extending in an oblique direction with respect to the direction of the directivity of the light which has entered the light guide are formed in the vicinity of an edge in which the light incident end surface is formed in the light outputting surface or the back surface. In an aspect of the present invention, the obliquely elongated lenses extend in a direction inclined at an angle corresponding to a half of a necessary light spread angle with respect to the direction of the directivity of the light which has entered the light guide. In an aspect of the present invention, in a shape of a section perpendicular to the extending direction of the obliquely elongated lenses, the existence proportion of angle components of 20° or more and 50° or less in the absolute value of the inclination angle formed by a tangent of each micro region with the obliquely elongated lens forming surface is 10% or more.

In order to attain the above object, according to the present invention, there is also provided a surface light source device comprising: a light guide for the surface light source device, according to any one of claims 1 to 41; the primary light source disposed adjacent to the light incident end surface of the light guide; and at least one light deflection element disposed adjacent to a light outputting surface of the light guide, the light deflection element having a light entrance surface positioned facing the light outputting surface of the light guide, and a light exit surface on an opposite side, and comprising a plurality of elongated lenses extending in a direction substantially parallel to an incident end edge on which the light incident end surface of the light guide is formed and extending in parallel to one another on the light entrance surface of the light deflection element adjacent to the light guide.

In an aspect of the present invention, each of the plurality of elongated lenses of the light entrance surface of the light deflection element comprises two surfaces, and totally reflects the light which has been incident on one of the surfaces by the other surface. In an aspect of the present invention, a light reflection element is disposed facing the back surface of the light guide.

In an aspect of the present invention, the light incident end surface is formed in one end edge or one corner portion of the light guide. In an aspect of the present invention, a plurality of primary light sources are arranged at an interval adjacent to the one end edge or corner portion of the light guide, and a region in which the existence proportion of angle components of 30° or more and 50° or less in the absolute value of the inclination angle is 10% or more is disposed in the vicinity of the end edge of the light guide in such a manner that lights coming from the adjacent primary light sources are superimposed upon each other in the region. In an aspect of the present invention, a plurality of primary light sources are arranged at an interval adjacent to the one end edge or corner portion of the light guide, and an average inclination angle of a light outputting functional structure of the light guide in a region of the front surface of the primary light source is different from that in a region between the primary light sources. In an aspect of the present invention, a plurality of primary light sources are arranged at an interval adjacent to the one end edge or corner portion of the light guide and, when only one of the primary light sources is turned on, normal luminance is measured at an interval of 1 mm in a length direction of a 0.5 mm wide region of 3 mm to 3.5 mm from the edge of an effective light emitting region of the light guide on the side of the light incident end surface, and a relation between a measurement position and the luminance is plotted, a half-value width distance obtained is in a range of 0.8 time to 1.2 times with respect to a distance between the adjacent primary light sources.

BRIEF DESCRIPTION OF THE DRAWINGS

FIGS. 4A and 4B are bottom plan views showing the light guide according to the present invention together with the primary light source;

FIGS. 10A and 10B are bottom plan views showing the light guide according to the present invention together with the primary light source;

FIG. 11 is a schematic plan view showing a method of measuring a normal luminance distribution of a surface light source device according to the present invention;

FIG. 16 is a diagram showing one example of the cross-sectional shape of the elongated lens of the light guide according to the present invention;

FIG. 17 is a diagram showing one example of the cross-sectional shape of the elongated lens of the light guide according to the present invention;

FIG. 18 is a diagram showing one example of the cross-sectional shape of the elongated lens of the light guide according to the present invention;

FIG. 19 is a diagram showing one example of the cross-sectional shape of the elongated lens of the light guide according to the present invention;

FIG. 20 is a diagram showing one example of the cross-sectional shape of the elongated lens of the light guide according to the present invention;

BEST MODE FOR CARRYING OUT THE INVENTION

Embodiments of the present invention will be described hereinafter with reference to the drawings.

Figure 1:
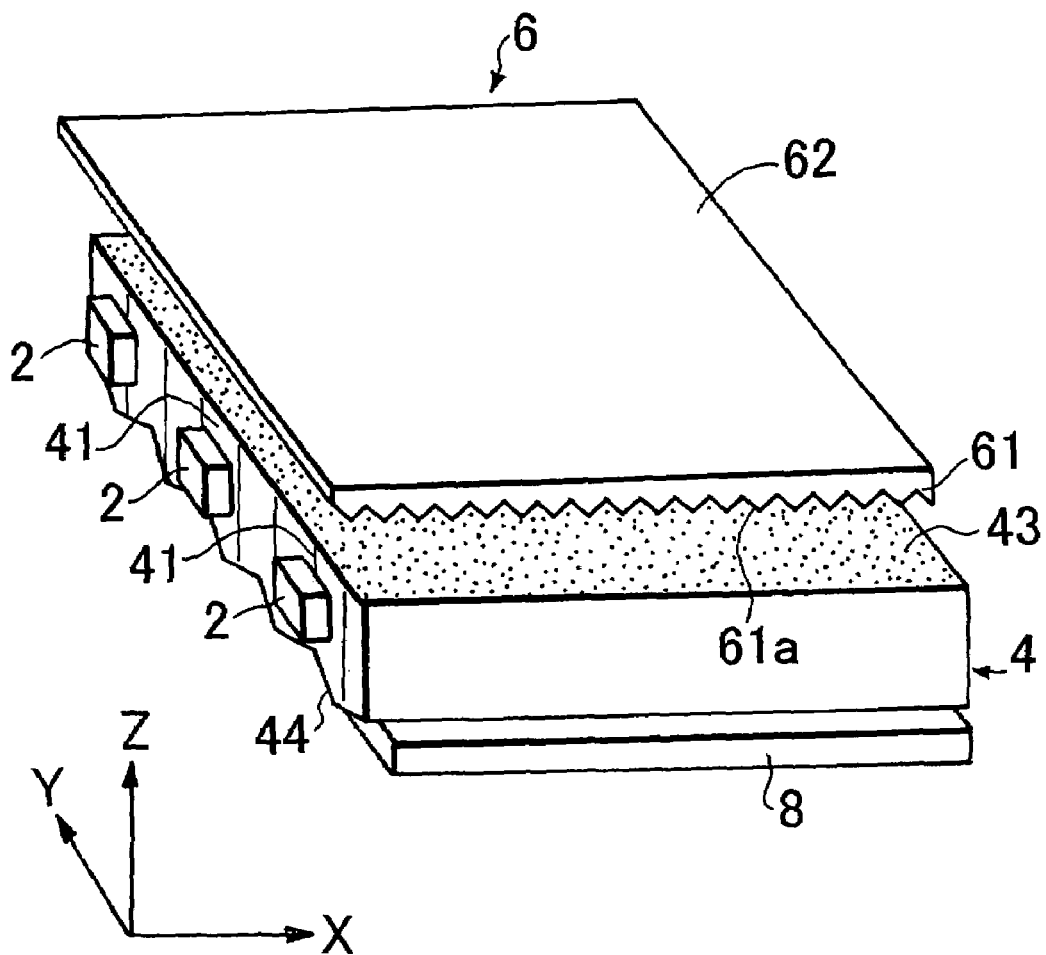
FIG. 1 is an exploded perspective view showing a surface light source device according to the present invention.

FIG. 1 is an exploded perspective view showing one embodiment of a surface light source device according to the present invention. As shown in FIG. 1, the surface light source device of the present embodiment comprises: three LEDs 2 which are point primary light sources; a light guide 4 having a rectangular plate shape in an XY-plane, which allows light emitted from the LED to enter the light guide 4 via a light incident end surface and which guides the light and outputs the light via a light outputting surface; and a light deflection element 6 and a light reflection element 8 disposed adjacent to the light guide. The light guide 4 has two upper/lower main surfaces and four edges connecting outer peripheral edges of the main surfaces to each other.

The LEDs 2 are arranged adjacent to one (left front-side edge: incident edge) of a pair of edges of the light guide 4, which are substantially parallel to each other, and at appropriate mutual distances in a middle and on opposite sides with respect to a Y-direction. In the present invention, the number of point light sources such as LEDs which are primary light sources is preferably as small as possible from a viewpoint of reduction of power consumption, but a plurality of light sources can be arranged at equal intervals or in the vicinity of one another depending on a size or the like of the light guide 4.

Light incident end surfaces 41 corresponding to positions in which the LEDs 2 are disposed are formed on an incident edge of the light guide 4. The light incident end surface 41 formed on the light guide 4 may be formed by cutting the incident edge in a concave shape in such a manner as to form a concave cylindrical surface shape or the like. The LED light outputting surface and the light incident end surface preferably have mutually fitted concave/convex shapes (including a case where both surfaces are flat surfaces).

Moreover, the light incident end surface 41 is preferably roughened in order to enlarge spread of light in an XY-plane. Examples of a method of forming the rough surface include a cutting method with a milling tool or the like, a polishing method with a whetstone, sane paper, buff or the like, and a method by blast processing, discharge processing, electrolytic polishing, chemical polishing or the like. The examples of blast particles for use in the blast processing include spherical particles such as glass beads, and polygonal particles such as alumina beads. When the particles having polygonal shapes are used, the rough surface having a large effect of spreading the light can be preferably formed. When a processing direction of the cutting or the polishing is adjusted, an anisotropic rough surface can be formed. This rough-surface processing can be directly performed with respect to the light incident end surface of the light guide, but a portion corresponding to the light incident end surface of a mold can be processed and transferred at a forming time.

One main surface (upper surface in the figure) of the light guide 4 is constituted as a light outputting surface 43. The light outputting surface 43 comprises a directive light outputting functional structure for outputting the light guided in the light guide 4 in a tilt direction (i.e., direction tilted with respect to an XY-plane) with respect to the light outputting surface 43. The directive light outputting functional structure is constituted of, for example, the rough surface (mat surface). The directive light outputting functional structure outputs the light having directivity in a distribution in an XZ-plane including both a normal direction (Z-direction) of the light outputting surface 43 and an X-direction perpendicular to the incident edge. An angle formed by direction of peak of output light distribution with the light outputting surface 43 is, for example, 10° to 40°, and a half-value width of the output light distribution is, for example, 10° to 40°.

Figure 2:
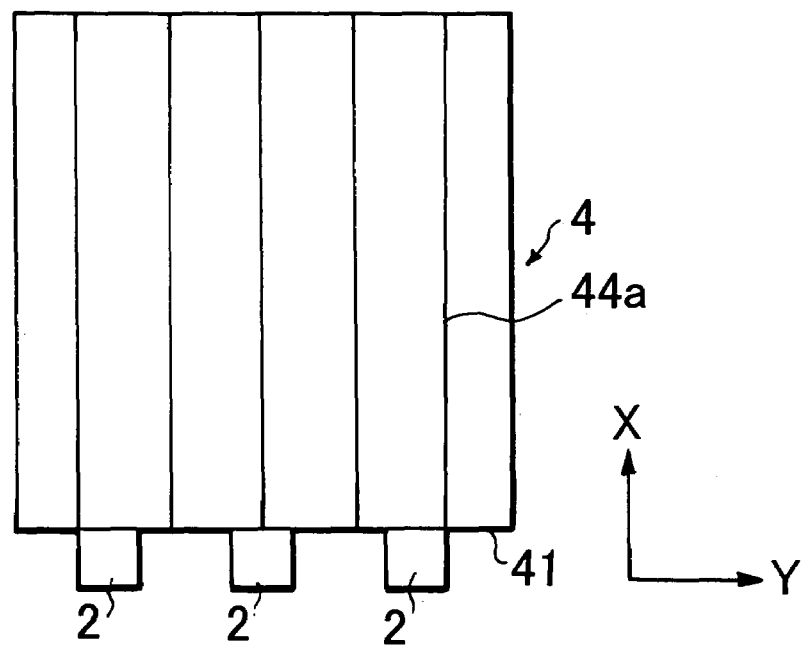
FIG. 2 is a bottom plan view showing a light guide according to the present invention together with a primary light source.

In the light guide 4, the other main surface (lower surface in the figure: back surface) is constituted as an elongated lens forming surface 44 which is an elongated concave/convex structure forming surface. The elongated lens forming surface 44 has elongated lenses which are a large number of elongated concave/convex structures extending in a direction substantially along a direction (direction of a maximum intensity in a light intensity distribution) of the directivity of the light emitted from the LED 2 and introduced into the light guide 4 and arranged substantially in parallel to one another. For example, when the direction of the directivity of the light introduced into the light guide 4 is substantially the X-direction, as shown in FIG. 2, the direction of elongated lenses 44a can be set to the X-direction (FIG. 2 shows ridge lines of the respective elongated lenses 44a). It is to be noted that in the present invention, the direction of the elongated lens 44a may shift from the direction of the directivity of the light introduced into the light guide 2 in a range in which the effect of spreading the light is not largely impaired, and this direction is regarded as the direction substantially extending along the direction of the directivity of the light introduced into the light guide 4. In this case, the direction of the elongated lens 44a is preferably set to a range of 20° or less with respect to the direction of the directivity of the light introduced into the light guide, more preferably to a range of 10° or less. When the elongated lens is formed in this direction, the light applied to the light guide is spread in the XY-plane, and a dark region is not easily generated.

The light deflection element 6 is disposed on the light outputting surface 43 of the light guide 4. Two main surfaces of the light deflection element 6 are entirely positioned in parallel to the XY-plane. One (main surface positioned on the side of the light outputting surface 43 of the light guide) of two main surfaces is constituted as a light entrance surface 61, and the other is constituted as a light exit surface 62. The light exit surface 62 is constituted as a flat surface parallel to the light outputting surface 43 of the light guide 4. The light entrance surface 61 is constituted as an elongated lens forming surface on which a large number of elongated lenses 61a are arranged in parallel to one another. The elongated lenses 61a of the light entrance surface 61 extend in a direction substantially perpendicular to the direction of the directivity of the light applied to the light guide 4 from the LED 2, and are formed in parallel to one another. In the present embodiment, the elongated lenses 61a extend in a Y-direction.

Figure 3:
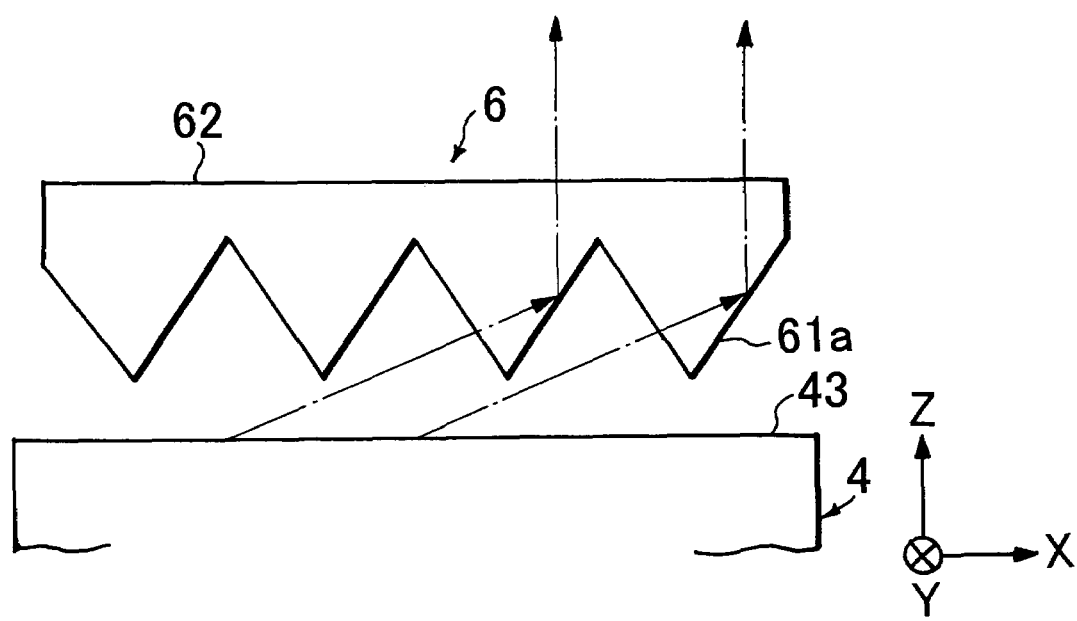
FIG. 3 is a diagram showing a state of light deflection by a light deflection element.

FIG. 3 shows a state of light deflection by the light deflection element 6. This figure shows a travel direction of a peak output light (light corresponding to the peak of the output light distribution) from the light guide 4 in the XZ-plane. The light obliquely output from the light outputting surface 43 of the light guide 4 is incident on a first surface of the elongated lens 61a, and is totally reflected by a second surface and output substantially in a direction of a normal of the light exit surface 62. In a YZ-plane, luminance in the direction of the normal of the light exit surface 62 can be sufficiently enhanced in a broad-range region by the above-described function of the elongated lens 44a.

In the present invention, the cross-sectional shape of the elongated concave/convex structure of the elongated lens 44a or the like formed in the light guide 4 is formed to be proper in order to suppress development of brightness unevenness. There will be described a method of calculating an inclination angle (micro inclination angle) in a micro region and existence proportion (distribution degree) of an angle component based on the angle, necessary for specifying the elongated concave/convex structure such as the elongated lens cross-sectional shape or the like in the present invention.

As a cross-sectional surface for calculating a micro inclination angle and a histogram which specifies the cross-sectional shape of the elongated concave/convex structure of the elongated lens 44a or the like, a cross-sectional surface substantially perpendicular to the direction in which the elongated concave/convex structure such as the elongated lens or the like extends is taken (see FIG. 4A). When the elongated concave/convex structures of the elongated lenses 44a are not completely parallel to one another, a curved cross-sectional surface perpendicular to the extending direction of each elongated concave/convex structure such as elongated lens or the like is taken (see FIG. 4B). An example of a cross-sectional shape obtained by photographing the cross-sectional surface (obtained cross-sectional surface cut by the YZ-plane) of the actual light guide is shown in FIG. 5.

Figure 5:
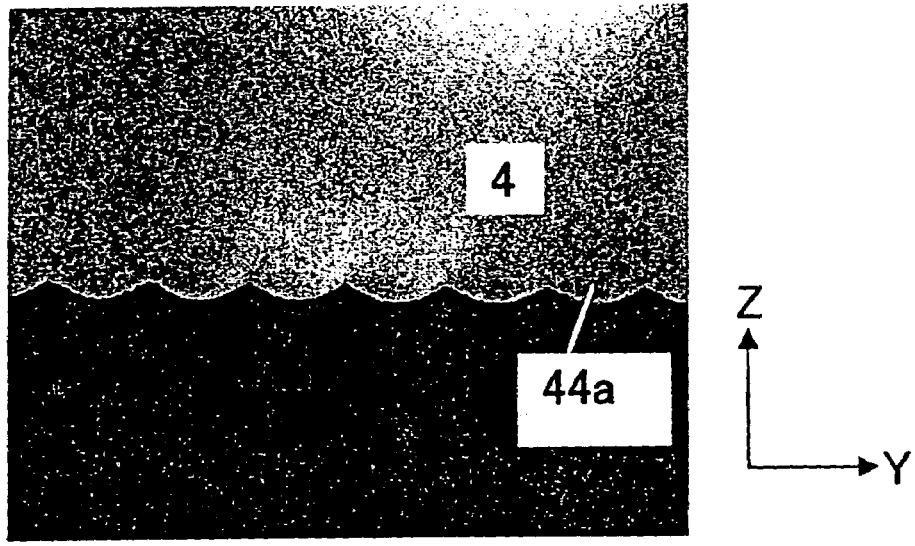
FIG. 5 is a diagram showing one example of a cross-sectional shape of an elongated lens of the light guide according to the present invention.
Figure 6A:
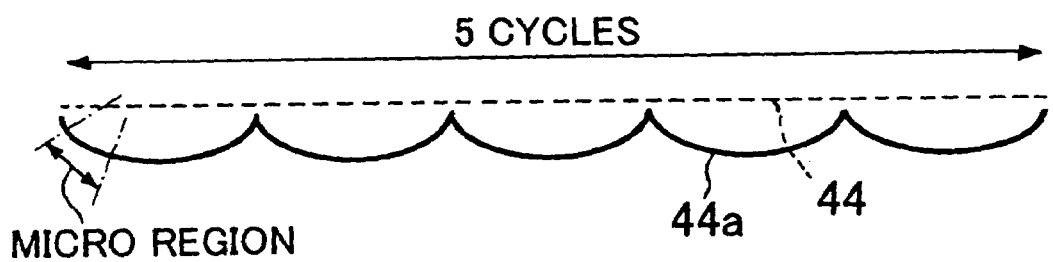
FIGS. 6A and 6B are explanatory views of a calculation method of an inclination angle for specifying the cross-sectional shape of the elongated lens of the light guide according to the present invention.

As shown in FIG. 6A, shapes of five cycles of a repeated structure of the cross-sectional shape are extracted from the cross-sectional shape shown in FIG. 5. This cross-sectional shape is equally divided into 500 along shape lines (100 equal shapes per repeated unit) to form 500 micro regions. It is to be noted that the number of the cycles of the extracted cross-sectional shapes is not limited to five, the number of divisions is not limited to 500, and they are appropriately changeable as long as an appropriate micro inclination angle or histogram representing the whole cross-sectional shape can be obtained.

Figure 6B:
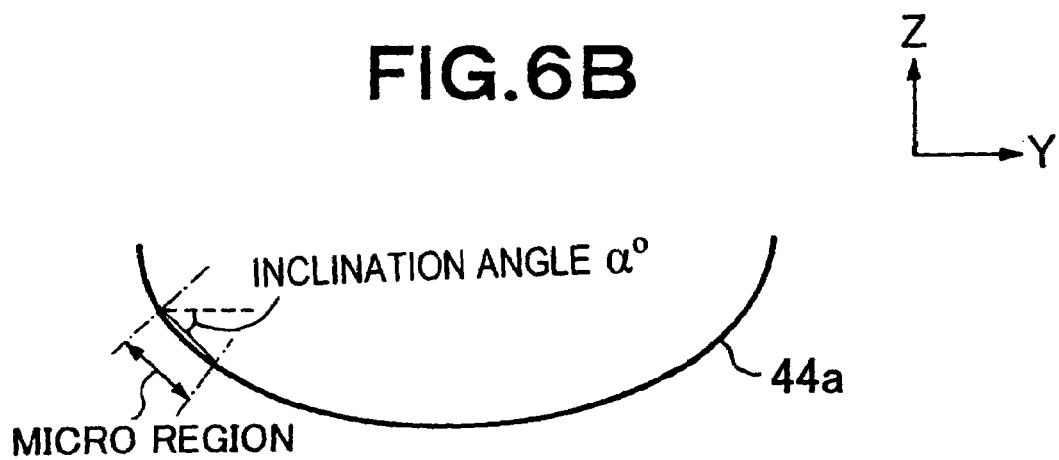
Figure 7:
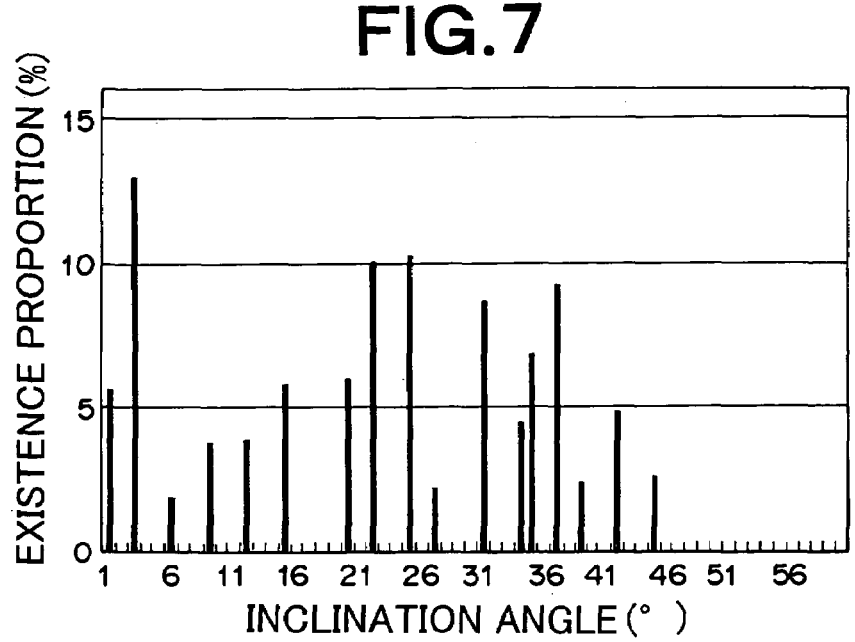
FIG. 7 is a diagram showing one example of the histogram of the inclination angle.

As shown in FIG. 6B, in each micro region, an absolute value of an angle (inclination angle) formed by a tangent (e.g., tangent in a middle position of the corresponding micro region: the tangent may be approximately represented by a line segment connecting opposite ends to each other as shown in FIG. 6B: this also applies to the following) with an elongated concave/convex structure forming surface [here indicating a plane disregarding the elongated concave/convex structure like the elongated lens or the like: this also applies to the following] like the elongated lens forming surface 44 or the like is obtained. The histogram (ratio of the number of micro regions having the respective inclination angles to the total number of micro regions) of the absolute value of the inclination angle with respect to all the micro regions is calculated every angle of 1° (i.e., the corresponding angle is set to $\alpha°$, and an angle range which is $\alpha°-0.5°$ or more and which is less than $\alpha°+0.5°$ is represented by the angle $\alpha°$). A calculation example of the histogram is shown in FIG. 7.

In the obtained histogram, a ratio of the number of micro regions having angles in a certain range to the total number of micro regions is obtained as the existence proportion of the angle component in the corresponding angle range. The shape of the elongated concave/convex structure like the elongated lens or the like is specified by this existence proportion. For example, when the ratio of the number of the micro regions in an angle range of 20° or more and 50° or less to the total number of the micro regions is 35%, the existence proportion of the angle component of 20° or more and 50° or less is assumed to be 35%.

Figure 8:
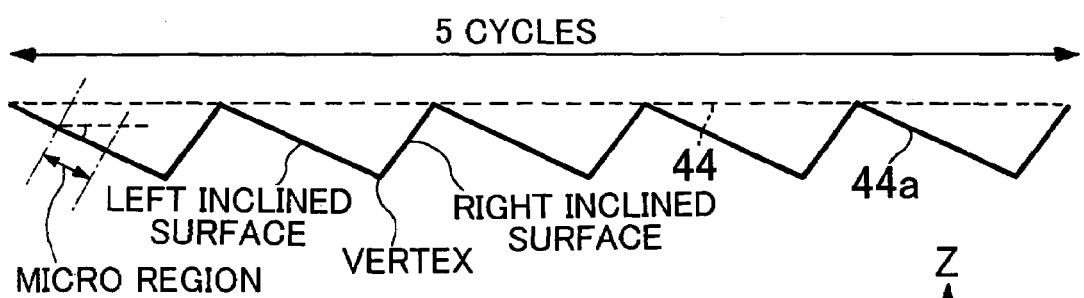
FIG. 8 is an explanatory view of a method of calculating the histogram of the inclination angle for specifying the cross-sectional shape of an asymmetrical elongated lens of the light guide according to the present invention.

As shown in FIG. 8, when right/left of the shape of each repeated unit of the repeated structure of the cross-sectional shape is asymmetrical, the shape of the repeated structure of the cross-sectional shape for five periods is extracted, an only left portion of each repeated unit is equally divided into 50 portions along shape lines, and the portion is divided into 250 micro regions in total. Similarly, an only right portion of each repeated unit is equally divided into 50 portions along the shape lines, and the portion is divided into 250 micro regions in total. Moreover, in each micro region of the left portion, the absolute value of the angle (inclination angle) formed by the tangent with the elongated concave/convex structure forming surface like the elongated lens forming surface 44 or the like is obtained, and the histogram of the inclination angle absolute values with respect to all the micro regions is calculated every angle of 1°. Similarly, the histogram of the absolute value of the inclination angle with respect to all the micro regions is also calculated every angle of 1° with respect to the right portion. It is to be noted that the number of the cycles of the extracted cross-sectional shapes is not limited to five, the number of divisions is not limited to the above, and they are appropriately changeable as long as an appropriate micro inclination angle or histogram representing the whole cross-sectional shape can be obtained with respect to the respective left and right portions.

Figure 9:
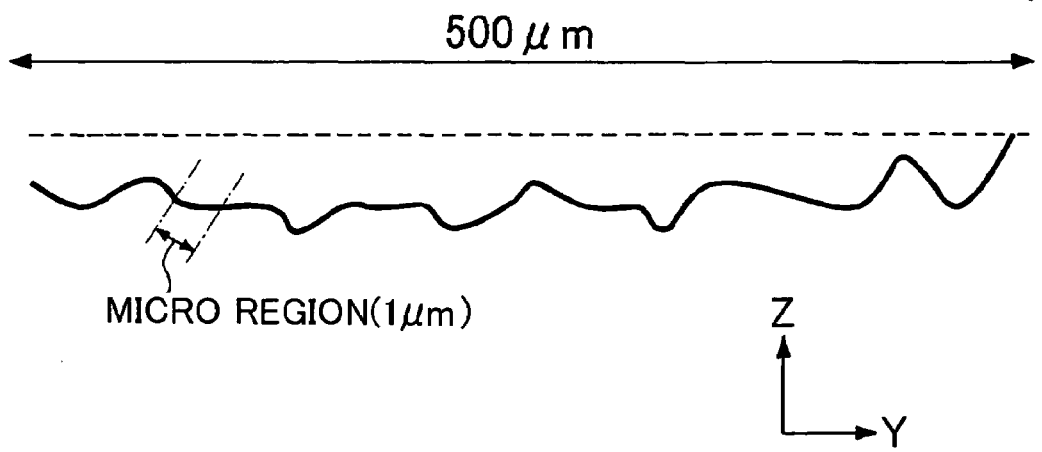
FIG. 9 is an explanatory view of the method of calculating the histogram of the inclination angle for specifying the cross-sectional shape of an elongated concave/convex structure having an irregular shape of the light guide according to the present invention.

It is to be noted that as shown in FIG. 9, the elongated concave/convex structure sometimes has an irregular shape which cannot be necessarily recognized as repetition of a unit shape in the cross-sectional shape. In this case, however, a portion having a length of 500 μm measured along the shape line of the cross-sectional shape is extracted, and this portion is equally divided into 500 portions along the shape line, and the histogram is calculated in the same manner as above with respect to each micro region obtained in this manner and having a length of 1 μm. It is to be noted that the length of the extracted cross-sectional shape is not limited to 500 μm, the number of divisions is not limited to 500, and they are appropriately changeable as long as an appropriate micro inclination angle or histogram representing the whole cross-sectional shape can be obtained.

Moreover, in the present invention, in the cross-sectional shape regularly repeated by substantially the same unit shape (i.e., in a case where the elongated concave/convex structure is the elongated lens), the shape of a valley portion (region in the vicinity of a lowest position in the cross-sectional shape) formed in a boundary portion between the adjacent repeated units largely influences an optical performance. Therefore, a lens valley portion inclination angle is adopted as an evaluation item. The angle is measured as follows. As described above, the shape of the repeated structure of the cross-sectional shape, for example, for five cycles is extracted. This cross-sectional shape is equally divided, for example, into about 500 equal portions along the shape line (100 equal portions per repeated unit), and divided, for example, into 500 micro regions. In five lens valley portions formed in the boundary portion between the repeated units, an average value of the inclination angles of right six micro regions and left six micro regions from the boundary portion between the repeated units is obtained. Moreover, when the shape of each repeated unit is horizontally symmetrical, an average of ten average values obtained as described above is obtained as a valley portion inclination angle of the elongated lens. It is to be noted that when the shape of each repeated unit is horizontally asymmetrical, each average of five average values obtained as described above with respect to the right and left sides is obtained as right and left valley portion inclination angles of the elongated lens.

Figure 27:
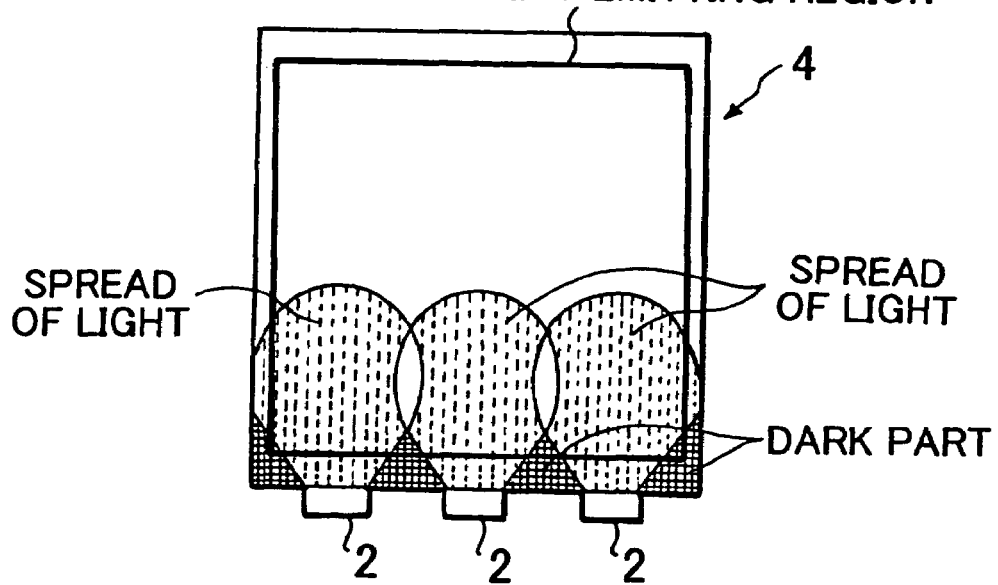
FIG. 27 is a schematic diagram showing generation of brightness unevenness in the surface light source device.
Figure 28:
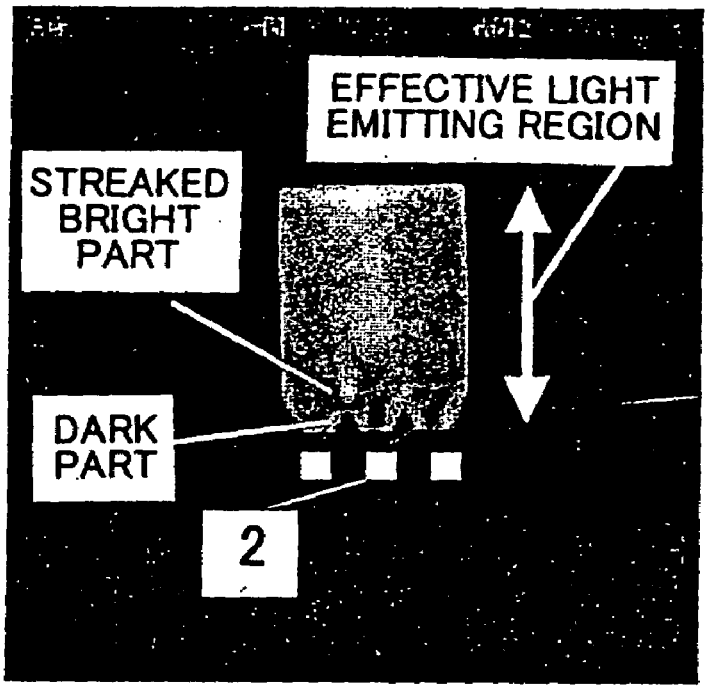
FIG. 28 is a diagram showing an example of the brightness unevenness in the surface light source device.

Additionally, the brightness unevenness of the dark part shown in FIG. 27 is easily visually recognized in the effective light emitting region in a case where an interval between primary light sources is large and a distance from the light incident end surface to the effective light emitting region is small. To reduce the brightness unevenness, it is necessary to sufficiently spread the light applied to the light guide in the vicinity of the light incident end surface of the primary light source in the XY-plane so that the light is observed through the light deflection element 6 in a broad region. Therefore, in the present invention, the elongated lens 44a in the vicinity of at least the primary light source, that is, in the vicinity of the light incident end surface is formed into a shape superior in a function of spreading the light. As described above, the light which has been introduced into the light guide travels in an oblique direction with respect to the direction of the directivity of the light by reflection by the elongated lens 44a in the XY-plane, and the light traveling in this oblique direction is returned toward the direction of the directivity of the introduced light by the reflection by the elongated lens 44a. As a result, the light which has been introduced into the light guide spreads in the XY-plane, and further travels in a direction substantially perpendicular to the elongated lens 61a of the light deflection element 6. Therefore, when the light is observed in a light outputting surface normal direction through the light deflection element, the light appears to spread.

To enhance this function of spreading the light, a shape in which the existence proportion of the angle components of 20° or more and 50° or less is not less than a certain value is preferable in the cross-sectional shape of the elongated concave/convex structure like the elongated lens 44a or the like. To further enhance the function of spreading the light: a shape is preferable in which the existence proportion of the angle components of 25° or more and 50° or less is not less than the certain value; a shape is preferable in which the existence proportion of the angle components of 30° or more and 50° or less is not less than the certain value; a shape is preferable in which the existence proportion of the angle components of 35° or more and 50° or less is not less than the certain value; or a shape is preferable in which the existence proportion of the angle components of 40° or more and 50° or less is not less than the certain value. To enhance this function, the larger the existence proportion of the above-described angle components is, the more preferable the shape is.

Here, the cross-sectional shape of the elongated concave/convex structure like the elongated lens 44a or the like means an averaged shape extracted during the above-described parameter calculation. Therefore, when the cross-sectional shape is the above-described irregular shape, the shape averaged regardless of the shape of the individual elongated concave/convex structure is meant. When the shape of each repeated unit of the repeated structure of the cross-sectional shape is asymetrical, the shape needs to correspond to the above shape with respect to the respective right and left portions. A case in which the elongated concave/convex structure is the elongated lens and the shape of each repeated unit of the repeated structure of the cross-sectional shape is symmetrical will be described hereinafter, but this also applies to other cases.

To enhance a function of spreading the light, the existence proportion of the angle components of 20° or more and 50° or less, indicated by the absolute value of the inclination angle in the cross-sectional shape of the elongated lens 44a, is 10% or more, preferably 20% or more, more preferably 30% or more in the vicinity of at least the primary light source (in the vicinity of the light incident end surface).

To further enhance the function of spreading the light, the existence proportion of the angle components of 25° or more and 50° or less in the cross-sectional shape of the elongated lens 44a is 10% or more, preferably 20% or more, more preferably 30% or more in the vicinity of at least the primary light source (in the vicinity of the light incident end surface).

To further enhance the function of spreading the light, the existence proportion of the angle components of 25° or more and 50° or less in the cross-sectional shape of the elongated lens 44a is 20% or more, preferably 30% or more, more preferably 40% or more in the vicinity of at least the primary light source (in the vicinity of the light incident end surface). Alternatively, the existence proportion of the angle components of 30° or more and 50° or less in the cross-sectional shape of the elongated lens 44a is 5% or more, preferably 10% or more, more preferably 15% or more.

To further enhance the function of spreading the light, the existence proportion of the angle components of 30° or more and 50° or less in the cross-sectional shape of the elongated lens 44a is 10% or more, preferably 20% or more, more preferably 30% or more in the vicinity of at least the primary light source (in the vicinity of the light incident end surface). Alternatively, the existence proportion of the angle components of 35° or more and 50° or less in the cross-sectional shape of the elongated lens 44a is 8% or more, preferably 10% or more, more preferably 20% or more. Alternatively, the existence proportion of the angle components of 400 or more and 50° or less in the cross-sectional shape of the elongated lens 44a is 2% or more, preferably 3% or more, more preferably 5% or more.

To enhance luminance measured in the normal direction of the light outputting surface, a function of directing the light in an oblique direction with respect to the direction of directivity of the light applied to the light guide in a plane parallel to the light outputting surface toward the direction of the directivity of the light is preferably large. For this purpose, it is preferable to dispose the elongated lens 44a having a function of converging the light in a direction in which the elongated lens 44a extends, while changing the travel direction of the light by reflection.

Figure 29:
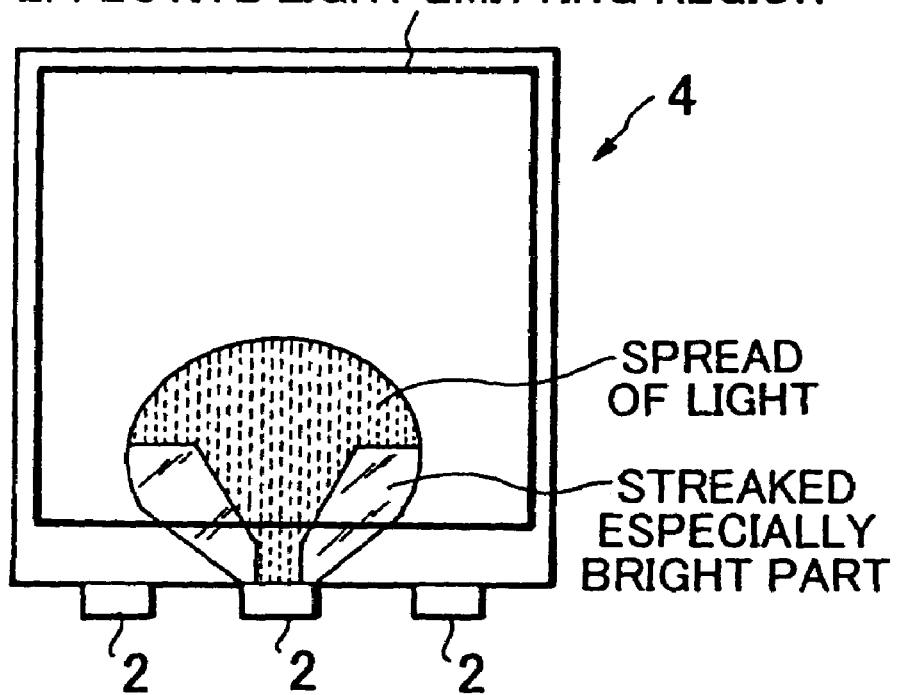
FIG. 29 is a schematic diagram showing the generation of the brightness unevenness in the surface light source device.

To suppress bright streaked brightness unevenness in the oblique direction, generated when the light is spread in a specific direction with anisotropy by the elongated lens 44a as shown in FIG. 29, the cross-sectional shape of the elongated lens 44a is preferably formed into a curved shape in such a manner as to prevent the light from being concentrated at a specific angle. Concretely, when assuming that a certain angle in the cross-sectional shape of the elongated lens 44a is α°, and obtaining the existence proportion of the angle components of α° or more and α°+10° or less with respect to all the angles in a range of α°=0° to 80° in the vicinity of at least the primary light source, a maximum value thereof is 60% or less, preferably 50% or less, more preferably 40% or less.

When the maximum value is excessively large, the cross-sectional shape of the elongated lens 44a becomes linear, the light is easily spread in the certain specific direction with the anisotropy, and therefore the bright streaked brightness unevenness in the oblique direction is generated as shown in FIG. 29.

On the other hand, when the maximum value of the existence proportion of the angle components of $\alpha°$ or more and $\alpha°+10°$ or less is reduced, the cross-sectional shape of the elongated lens cannot help having many angle components. In the present invention, when the angle components of 35° or more excessively increase as described later, the light traveling in the direction of the directivity of the introduced light relatively increases, and a phenomenon in which a region in front of the primary light source becomes bright. Additionally, the function of spreading the light is also small with respect to the angle components larger than 50°. Therefore, most of the micro regions of the cross-sectional shape of the elongated lens are preferably distributed in a range of the angle components of 60° or less, preferably 50° or less. Therefore, the maximum value of the existence proportion of the angle components of $\alpha°$ or more and $\alpha°+10°$ or less is 15% or more, preferably 20% or more.

For the above-described reasons, the existence proportion of the angle components of 40° or more and 50° or less is preferably 60% or less, more preferably 50% or less, and further preferably 40% or less. The existence proportion of the respective angle components of 35° or more and 50° or less is preferably 90% or less, more preferably 75% or less, and further preferably 60% or less. The existence proportion of the angle components of 30° or more and 50° or less is preferably 80% or less.

Figure 32:
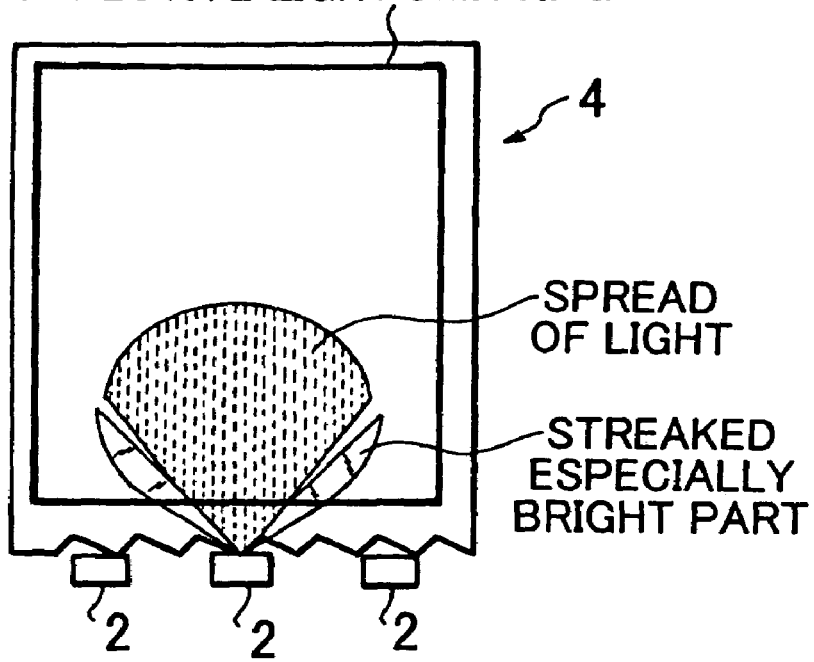
FIG. 32 is a schematic diagram showing the generation of the brightness unevenness in the surface light source device.
Figure 33:
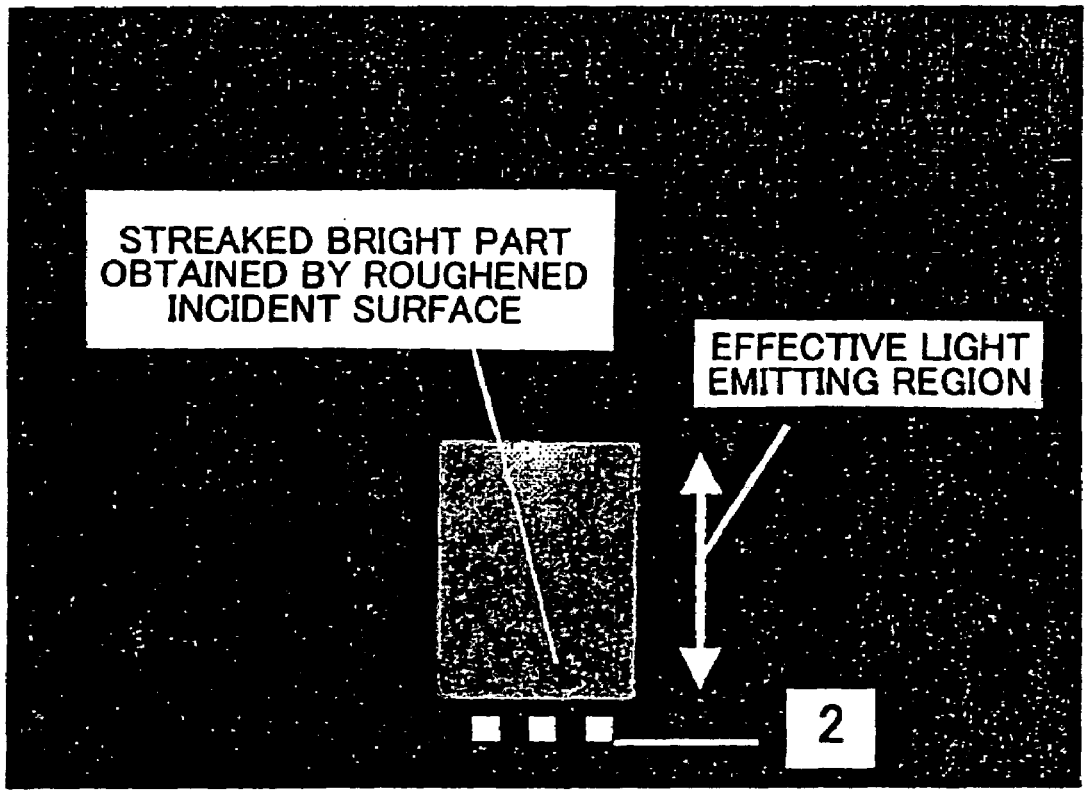
FIG. 33 is a diagram showing an example of the brightness unevenness in the surface light source device.

Next, the light incident end surface 41 will be described. When the light incident end surface is roughened, much light in the oblique direction with respect to the direction of the directivity of the light in the plane parallel to the light outputting surface 43 of the light applied to the light guide enters. Accordingly, the spread of the light in the XY-plane increases, and the dark part shown in FIG. 27 is reduced. However, when the spread of the light increases, the light traveling in the oblique direction is easily output by the reflection by the elongated lens 44a, a bright streaked portion shown in FIG. 32 is easily generated at an angle with a largest spread of the light.

To prevent the brightness unevenness from being generated in an effective light emitting region, the structure of the elongated lens in a region in the vicinity of the primary light source is effectively varied from that in the effective light emitting region. Concretely, the angle components of 30° or more and 50° or less, having best function of spreading the light, are increased in the vicinity of the primary light source, and reduced in the effective light emitting region. Alternatively, a valley portion inclination angle is increased in the vicinity of the primary light source, and reduced in the effective light emitting region. By these means, the light spreads in the oblique direction with respect to the direction of the directivity of the light by the reflection by the elongated lens 44a in the vicinity of the primary light source, and travels while being sometimes returned in the direction of the directivity of the introduced light. As a result, the light applied to the light guide 4 spreads in the XY-plane. Furthermore, the light output in a direction perpendicular to the elongated prism of a lens sheet which is the light deflection element 6, for example, the prism sheet increases. Therefore, when the light is observed through the prism sheet, the light appears to spread. Moreover, the light having a most spread angle, which is a cause for the brightness unevenness of FIG. 32, does not return to the direction of the directivity of the introduced light by the reflection by the elongated lens 44a having a different shape in the effective light emitting region. As a result, at the time of the observation through the prism sheet, the streaked bright line shown in FIG. 32 is not seen.

Further concretely, as shown in FIGS. 10A and 10B, a region A in the vicinity of the primary light source is a region having a large existence proportion of the angle components of 30° or more and 50° or less in the cross-sectional shape of the elongated lens forming surface. The region is changed to another region B where the existence proportion of the angle components of 30° or more and 50° or less is small or the valley portion inclination angle is smaller, before entering the effective light emitting region, so that a boundary between the regions A and B is preferably prevented from being visually recognized. Concretely, the region is preferably changed to the region B at 0.1 mm or more, further preferably 0.3 mm or more, more preferably 0.5 mm or more before the effective light emitting region. Moreover, the whole effective light emitting region is set as the region B (FIG. 10A) or a part of the effective light emitting region is set as the region B (FIG. 10B).

In the concrete cross-sectional shape of the elongated lens 44a of the region B, the existence proportion of the angle components of 30° or more and 50° or less is smaller than that of the region A by 5% or more, preferably 8% or more. Alternatively, in the concrete cross-sectional shape of the elongated lens 44a of the region B, the valley portion inclination angle is smaller than that of the region A by 5% or more, preferably 10% or more, further preferably 15° or more. When the difference of the cross-sectional shape between the regions A and B is excessively small, an effect of preventing the brightness unevenness of FIG. 32 tends to drop.

Moreover, in the concrete shape of the elongated lens 44a of the region B, the existence proportion of the angle components of 30° or more and 50° or less is 40% or less, preferably 30% or less and 5% or more, preferably 10% or more, further preferably 15% or more. Alternatively, the existence proportion of the angle components of 35° or more and 50° or less is 30% or less, preferably 20% or less and 2% or more, preferably 8% or more, further preferably 13% or more. Alternatively, in the concrete shape of the elongated lens 44a of the region B, the valley portion inclination angle is 30° or less, preferably 25° or less, further preferably 20° or less and 5° or more, preferably 8° or more, further preferably 10° or more. When these angle component existence proportion or the valley portion inclination angle is excessively large, the effect of preventing the brightness unevenness of FIG. 32 tends to drop. When it is excessively small, the light spread in the region in the vicinity of the primary light source cannot be reflected in the direction perpendicular to the elongated prism of the prism sheet, the components of the light rising in the normal direction of the light outputting surface by the prism sheet are decreased, and, as a result, the luminance of the normal direction tends to drop.

In a structure of a changing portion between the regions A and B, the shape of the elongated lens 44a gradually changes. Accordingly, even when the changing portion is positioned in the vicinity of an end edge of the effective light emitting region (i.e., a boundary between the effective light emitting region and a region corresponding to a non-display portion of the liquid crystal display device), the structure of the elongated lens shape changing portion can be prevented from being reflected into the effective light emitting region.

As a method of partially changing the shape of the elongated lens forming surface, there is a roughening method. When at least a part of the surface of the elongated lens is roughened in various methods, at least a part of the elongated lens shape can be easily and inexpensively changed. A degree of this change may be continuously changed, and the elongated lens shape may be gradually changed depending on the position. When the elongated lens 44a is roughened, the brightness unevenness shown in FIG. 30 can be eliminated.

Figure 12A:
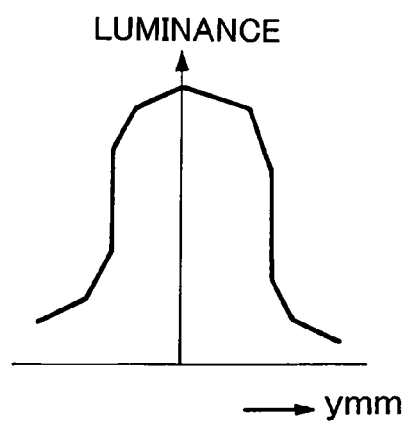
FIGS. 12A and 12B are diagrams showing an example of the normal luminance distribution.
Figure 12B:
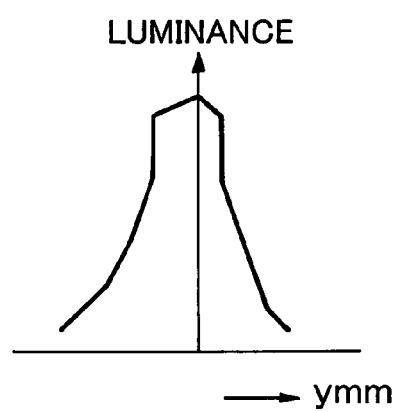
Figure 13A:
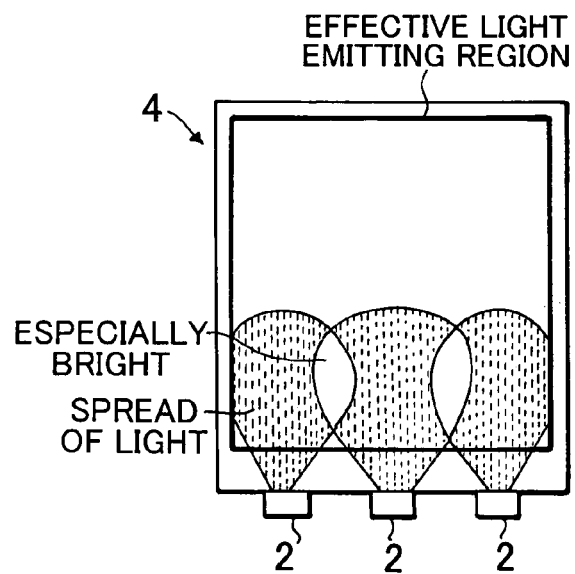
FIGS. 13A and 13B are diagrams showing an example of the luminance distribution based on use of a plurality of primary light sources.
Figure 13B:
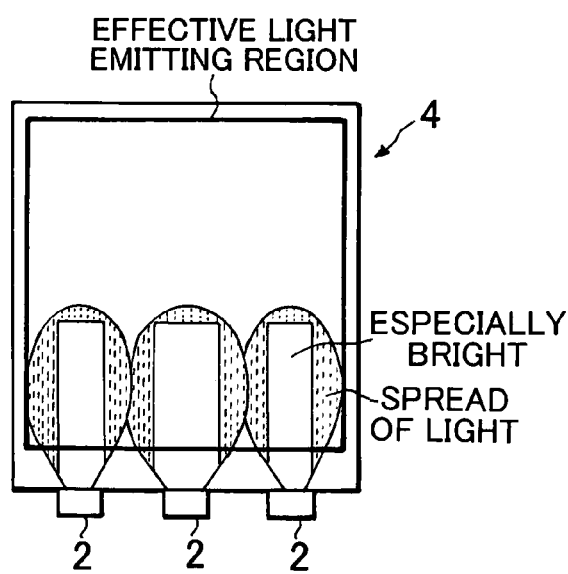
Figure 30:
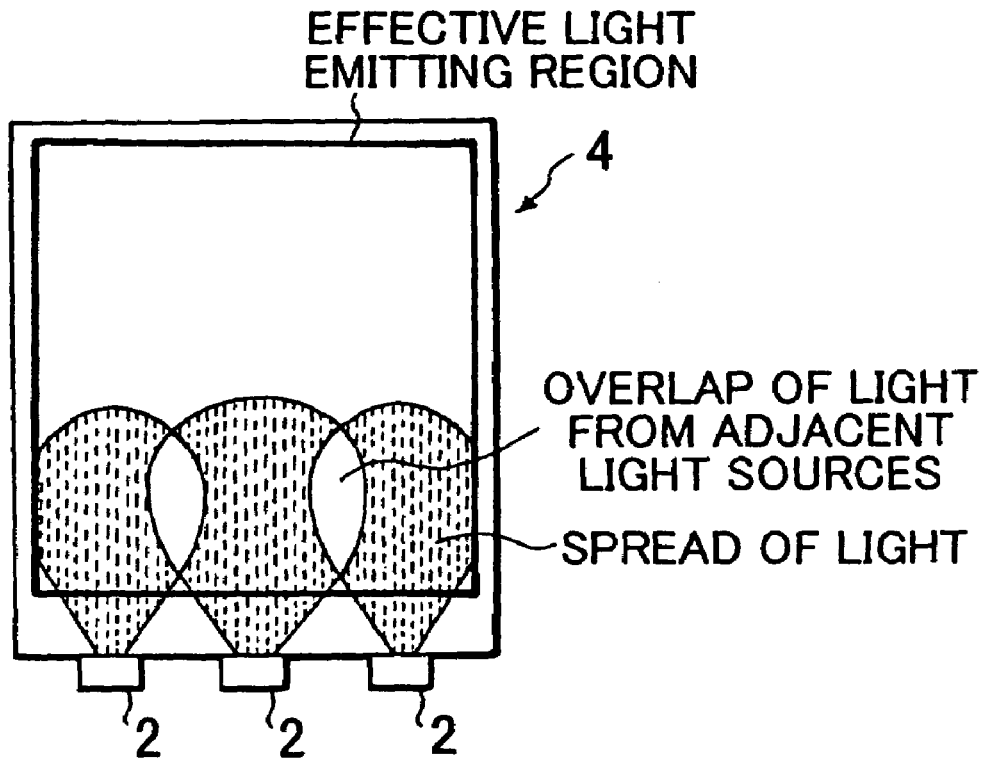
FIG. 30 is a schematic diagram showing the generation of the brightness unevenness in the surface light source device.
Figure 31:
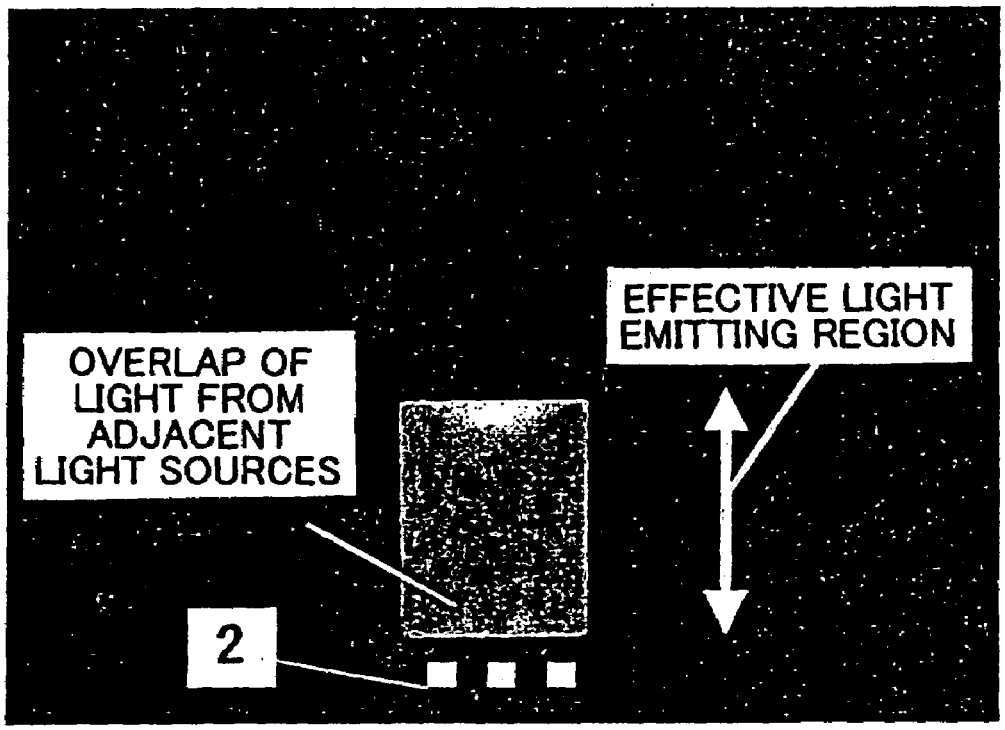
FIG. 31 is a diagram showing an example of the brightness unevenness in the surface light source device.

To reduce the brightness unevenness by overlap of the light emitted from a plurality of primary light sources shown in FIG. 30, a relation between the luminance distribution of the light emitted from each primary light source, and a distance between the light sources is preferably set to be appropriate. Concretely, when turning on only one of a plurality of primary light sources 2 disposed adjacent to the end edge of the light guide 4 in a state in which the light deflection element 6 and the light reflection element 8 are disposed, as shown in FIG. 11, normal luminance is measured at an interval of 1 mm along a length direction (y-direction) in a region S having a width of 0.5 mm at 3 mm to 3.5 mm from the end edge of the effective light emitting region on the side of the light incident end surface. When plotting a relation between a measurement position y [mm] and the luminance, a ratio of a half-value full-width distance to the distance between the primary light sources is in a range of 0.8 to 1.2 times, preferably substantially equal. FIGS. 12A and 12B show examples of a graph in which the relation between the measurement position y [mm] and the luminance is plotted. FIG. 12A shows a case where this ratio is larger than 1.2 times, and FIG. 12B shows a case where the ratio is smaller than 0.8 time. When this ratio is excessively large, as shown in FIG. 13A, the overlaps of the distributions of the light from the adjacent primary light sources 2 are enlarged, overlap portions become especially bright, and a bright/dark pattern is easily generated. When the ratio is excessively small, as shown in FIG. 13B, the spread of the distribution of the light from the primary light source 2 is running short, a region in front of the primary light source is especially bright, a region corresponding to an intermediate position between the adjacent primary light sources is relatively dark, and the bright/dark pattern is easily generated.

To obtain a proper relation between the luminance distribution of the light emitted from each primary light source, and the distance between the primary light sources as described above, the cross-sectional shape of the elongated lens 44a preferably satisfies the following condition in the vicinity of the primary light source. That is, when the half-value full-width distance is reduced, the existence proportion of the angle components of 35° or more and 60° or less of the elongated lens 44a, or the existence proportion of the angle components of 15° or less is preferably increased. Conversely, when the half-value full-width distance is increased, the existence proportion of the angle components of 35° or more and 60° or less of the elongated lens 44a, or the existence proportion of the angle components of 15° or less is preferably reduced. When the angle components of 35° or more are many, the light traveling obliquely with respect to the direction of the directivity of the introduced light is reflected by the elongated lens 44a, and output in the very vicinity of the primary light source. Therefore, the light traveling in the direction of the directivity of the introduced light relatively increases. When the angle components of 15° or less are many, the light does not easily spread by the elongated lens 44a, and the light traveling in the direction of the directivity of the introduced light relatively increases.

Concretely, since the distance between the primary light sources is typically 5 mm or more and 15 mm or less, in the cross-sectional shape of the elongated lens satisfying the above-described condition in this case, the existence proportion of the angle components of 35° or more and 60° or less is preferably 4% or more and 55% or less, or the existence proportion of the angle components of 15° or less is preferably 25% or more and 85% or less in the vicinity of at least the primary light source. The existence proportion of the angle components of 35° or more and 60° or less is further preferably 10% or more and 45% or less, more preferably 20% or more and 40% or less, or the existence proportion of the angle components of 15° or less is further preferably 30% or more and 70% or less.

When the light guide is incorporated in the surface light source device and used, the shape of the elongated lens 44a is preferably set in accordance with design of the surface light source device. Such embodiments will be described hereinafter.

Figure 14:
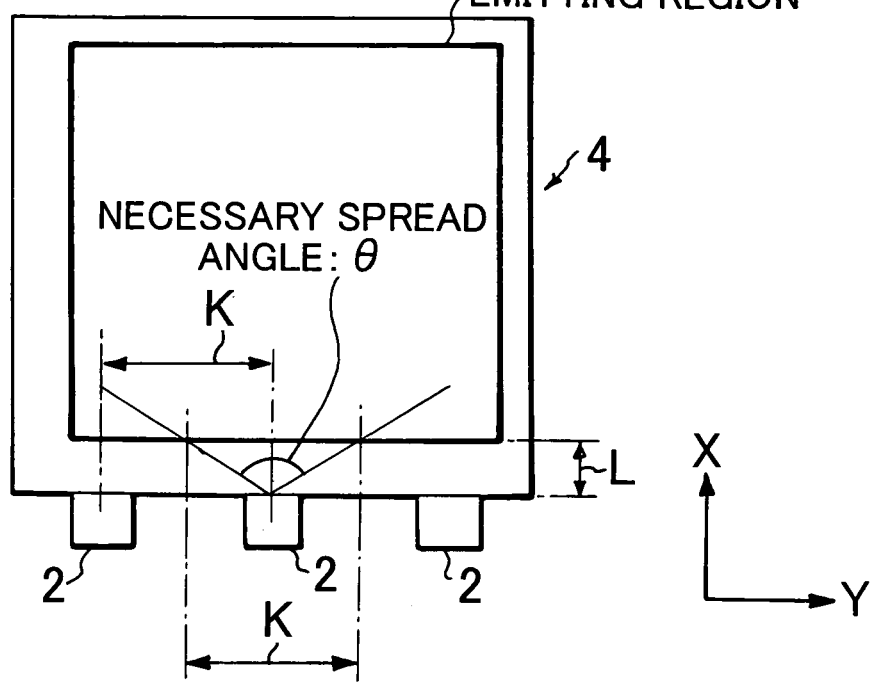
FIG. 14 is an explanatory view of a necessary spread angle.

The structure of the elongated lens 44a necessary for preventing the brightness unevenness shown in FIG. 27 from being visually recognized in the effective light emitting region varies with the distance among the plurality of primary light sources, and the distance between the light guide light incident end surface and the effective light emitting region. As shown in FIG. 14, assuming that the distance between the primary light sources is K, and the distance between the light guide light incident end surface and the effective light emitting region is L, the spread angle of the light needs to be larger than θ[°] obtained as follows in order to prevent the dark part from being superimposed on the effective light emitting region:

$$a=\tan^{-1}[K/(2L)]; \text{ and}$$

$$f=a\cdot 360/\pi.$$

The above-described θ is defined as a "necessary spread angle".

When the distance between the primary light sources is large, or the distance between the light incident end surface or the light incident end edge and the effective light emitting region is small, the dark part of FIG. 27 is visually recognized in the effective light emitting region unless the light is spread to the maximum before the effective light emitting region.

When the necessary spread angle is 100° or more, almost the whole region corresponding to a non-display portion between the light incident end edge and the edge of the effective light emitting region is preferably formed into a shape having a largest effect of spreading the light. In the shape, the existence proportion of the angle components of 30° or more and 50° or less is 10% or more, preferably 20% or more, further preferably 30% or more. Alternatively, the existence proportion of the angle components of 35° or more and 50° or less in the cross-sectional shape of the elongated lens 44a is 8% or more, preferably 10% or more, further preferably 20% or more. Alternatively, the existence proportion of the angle components of 40° or more and 50° or less in the cross-sectional shape of the elongated lens 44a is 2% or more, preferably 3% or more, more preferably 5% or more.

Moreover, to suppress the generation of the brightness unevenness shown in FIG. 29, the existence proportion of the angle components of 30° or more and 50° or less in the cross-sectional shape of the elongated lens 44a is preferably 80% or less. Alternatively, the existence proportion of the angle components of 35° or more and 50° or less in the cross-sectional shape of the elongated lens 44a is 90% or less, preferably 75% or less, further preferably 60% or less. Alternatively, the existence proportion of the angle components of 40° or more and 50° or less in the cross-sectional shape of the elongated lens 44a is 60% or less, preferably 50% or less, further preferably 40% or less.

In this case, in the non-display portion corresponding region, at least a region from the light guide light incident end edge to a position of 1 mm before the boundary between the light guide light incident end edge and the effective light emitting region is preferably formed into the above-described shape.

Even when the necessary spread angle is less than 100°, a part or all of the non-display portion corresponding region between the light incident end edge and the edge of the effective light emitting region is formed into the following shape, and then the dark part is not visually recognized in the effective light emitting region.

That is, when the necessary spread angle is 90° or more and less than 100°, the existence proportion of the angle components of 25° or more and 50° or less is 20% or more, preferably 30% or more, more preferably 40% or more. Alternatively, the existence proportion of the angle components of 30° or more and 50° or less is 5% or more, preferably 10% or more and further preferably 15% or more.

When the necessary spread angle is 80° or more and less than 90°, the existence proportion of the angle components of 25° or more and 50° or less is 10% or more, preferably 20% or more, further preferably 30% or more.

When the necessary spread angle is 70° or more and less than 80°, the existence proportion of the angle components of 20° or more and 50° or less is 10% or more, preferably 20% or more, further preferably 30% or more.

Moreover, to suppress the generation of the brightness unevenness shown in FIG. 29, the existence proportion of the angle components of 30° or more and 50° or less in the cross-sectional shape of the elongated lens 44a is preferably 80% or less. Alternatively, the existence proportion of the angle components of 35° or more and 50° or less in the cross-sectional shape of the elongated lens 44a is 90% or less, preferably 75% or less, further preferably 60% or less. Alternatively, the existence proportion of the angle components of 40° or more and 50° or less in the cross-sectional shape of the elongated lens 44a is 60% or less, preferably 50% or less, further preferably 40% or less.

To develop high luminance, the elongated lens 44a having a function of spreading the light well is preferably used. When the necessary spread angle is 90° or more and less than 100°, even the condition in a case where the necessary spread angle is 100° or more is also preferably satisfied. When the necessary spread angle is 80° or more and less than 90°, it is preferable to satisfy even the condition in a case where the necessary spread angle is 90° or more and less than 100°, and it is more preferable to satisfy even the condition in a case where the necessary spread angle is 100° or more. When the necessary spread angle is 70° or more and less than 80°, it is preferable to satisfy even the condition in a case where the necessary spread angle is 80° or more and less than 90°, it is more preferable to satisfy even the condition in a case where the necessary spread angle is 90° or more and less than 100°, and it is further preferable to satisfy even the condition in a case where the necessary spread angle is 100° or more.

The elongated lens having much effect of spreading the light is preferably disposed in a region along a distance from the light incident end edge to at least a position where the overlap of the light from the adjacent primary light sources is generated. This distance from the light incident end edge to the position where the overlap of the light is generated varies with the distance between the primary light sources. The elongated lens having much effect of spreading the light is preferably disposed in at least a region of: 1.5 mm from the light incident end edge, when the distance between the primary light sources is less than 7 mm; 2.0 mm from the light incident end edge, when the distance between the primary light sources is 7 mm or more and less than 9 mm; 3.0 mm from the light incident end edge, when the distance between the primary light sources is 9 mm or more and less than 11 mm; 4.0 mm from the light incident end edge, when the distance between the primary light sources is 11 mm or more and less than 13 mm; or 5 mm from the light incident end edge, when the distance between the primary light sources is 13 mm or more and less than 15 mm.

To eliminate the brightness unevenness shown in FIG. 32, a region where the elongated lens having a small existence proportion of the angle components of 30° or more and 50° or less or having a small valley portion inclination angle is formed is formed adjacent to the region where the above-described elongated lens is formed, and accordingly the region is preferably changed.

Alternatively, to more easily prepare the light guide without changing the region, the spread of the light by the elongated lens 44a in the vicinity of the primary light source is preferably suppressed to a degree equal to that of the necessary spread angle.

When the necessary spread angle is less than 100°, and the elongated lens 44a may have a small angle of spreading the light, the brightness unevenness in a case where the incident surface is roughened is not necessarily generated. Therefore, in this case, the effective light emitting region does not have to be the region where the elongated lens shaped in such a manner as to have a small existence proportion of the angle components of 30° or more and 50° or less, or a small valley portion inclination angle is formed. As a result, a mold for manufacturing the light guide can be more simply prepared. In this case, preferably the shape of the elongated lens 44a does not satisfy the above-described condition in a case where the necessary spread angle is 100° or more, when the necessary spread angle is 90° or more and less than 100°. When the necessary spread angle is 80° or more and less than 90°, it is preferable not to satisfy the above-described condition in a case where the necessary spread angle is 90° or more and less than 100° or the condition in a case where the necessary spread angle is 100° or more. When the necessary spread angle is 70° or more and less than 80°, it is preferable not to satisfy the condition in a case where the necessary spread angle is 80° or more and less than 90°, the condition in a case where the necessary spread angle is 90° or more and less than 100°, or the condition in a case where the necessary spread angle is 100° or more.

The arrangement of the regions A and B different from each other in the shape of the elongated lens 44a will be further described. As shown in FIG. 10A, the region A is disposed in the vicinity of the primary light sources 2, and the region B may be disposed in the whole effective light emitting region, and a region from the edge close to the primary light sources to the region A. As shown in FIG. 10B described above, the region A is disposed in the vicinity of the primary light sources 2, and the region B may be disposed in a band-shaped region adjacent to the region A and including the edge of the effective light emitting region close to the primary light sources. Here, the structure of a region other than the region B in the effective light emitting region may be similar to that of the region A, or may be another structure. Additionally, in this case, since the shape of the elongated lens 44a changes in the effective light emitting region, the shape is preferably gradually changed in order to prevent the brightness unevenness attributed to the shape change (shape changing) from being visually recognized.

Figure 15:
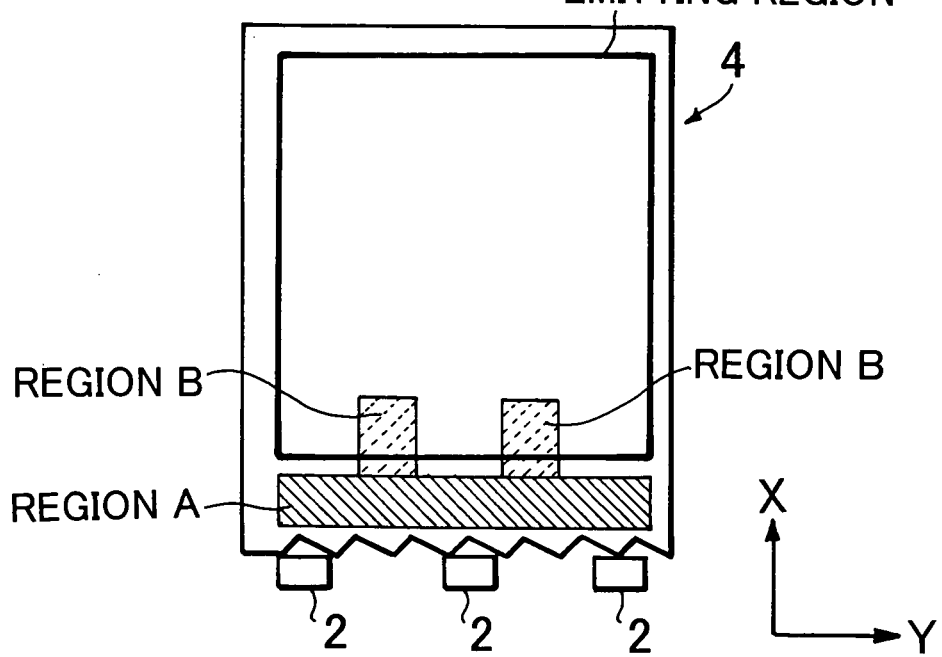
FIG. 15 is a bottom plan view showing the light guide according to the present invention together with the primary light source.

Furthermore, a structure in which the regions B are disposed in the form of islands in a place adjacent to the region A and including a part of the edge of the effective light emitting region on the side of the primary light source as shown in FIG. 15 is also preferable. Here, the structure of the region other than the region B in the effective light emitting region may be similar to that of the region A, or may be another structure. Additionally, in this case, since the shape of the elongated lens 44a changes in the effective light emitting region, the shape is preferably gradually changed in order to prevent the brightness unevenness attributed to the shape change (shape changing) from being visually recognized.

To reduce the brightness unevenness by the overlap of the light from a plurality of primary light sources shown in FIG. 30, as described above, the relation between the luminance distribution of the output light from each primary light source, and the distance between the primary light sources is preferably set to be appropriate.

Concretely, when the distance between the primary light sources is less than 7 mm, in the above-described histogram (degree distribution), the existence proportion of the angle components of 35° or more and 60° or less is 12% or more, preferably 20% or more, more preferably 30% or more and 55% or less, preferably 45% or less. Alternatively, the existence proportion of the angle components of 40° or more and 60° or less in the above-described degree distribution is 9% or more, preferably 16% or more, more preferably 24% or more and 42% or less, preferably 34% or less. Alternatively, the existence proportion of the angle components of 15° or less in the histogram is preferably 40% or more and 85% or less.

Moreover, when the distance between the primary light sources is 7 mm or more and less than 9 mm, the existence proportion of the angle components of 35° or more and 60° or less in the above-described histogram is 10% or more, preferably 18% or more, more preferably 28% or more and 53% or less, preferably 43% or less. Alternatively, the existence proportion of the angle components of 40° or more and 60° or less in the above-described histogram is 7% or more, preferably 14% or more, more preferably 22% or more and 40% or less, preferably 32% or less. Alternatively, the existence proportion of the angle components of 15° or less in the histogram is preferably 40% or more and 80% or less.

Furthermore, when the distance between the primary light sources is 9 mm or more and less than 11 mm, the existence proportion of the angle components of 35° or more and 60° or less in the above-described histogram is 8% or more, preferably 16% or more, more preferably 26% or more and 51% or less, preferably 41% or less. Alternatively, the existence proportion of the angle components of 40° or more and 60° or less in the above-described histogram is 5% or more, preferably 12% or more, more preferably 20% or more and 38% or less, preferably 30% or less. Alternatively, the existence proportion of the angle components of 15° or less in the histogram is preferably 35% or more and 75% or less.

Additionally, when the distance between the primary light sources is 11 mm or more and less than 13 mm, the existence proportion of the angle components of 35° or more and 60° or less in the above-described histogram is 6% or more, preferably 14% or more, more preferably 24% or more and 49% or less, preferably 39% or less. Alternatively, the existence proportion of the angle components of 40° or more and 60° or less in the above-described histogram is 3% or more, preferably 10% or more, more preferably 18% or more and 36% or less, preferably 28% or less. Alternatively, the existence proportion of the angle components of 15° or less in the histogram is preferably 30% or more and 70% or less.

Moreover, when the distance between the primary light sources is 13 mm or more and less than 15 mm, the existence proportion of the angle components of 35° or more and 60° or less in the above-described histogram is 4% or more, preferably 12% or more, more preferably 22% or more and 47% or less, preferably 37% or less. Alternatively, the existence proportion of the angle components of 40° or more and 60° or less in the degree distribution is 1% or more, preferably 8% or more, more preferably 16% or more and 34% or less, preferably 26% or less. Alternatively, the existence proportion of the angle components of 15° or less in the histogram is preferably 25% or more and 70% or less.

Examples of a preferable cross-sectional shape of the elongated lens 44a include: a shape in which a part or all of a cross-sectional shape line is constituted of a convex line curved outwards as shown in FIG. 16; a shape constituted of a concave line curved outwards as shown in FIG. 17; and a shape constituted of an outward convex region and an outward concave region as shown in FIG. 18. Examples of the preferable cross-sectional shape of the elongated lens 44a include: a polygonal shape (i.e., shape constituted of straight lines) shown in FIG. 19; and a shape in which straight lines are combined with a curved line as shown in FIG. 20. When the polygonal shape or the shape including the straight lines is used, the shape is preferably set to be especially proper in order to prevent the brightness unevenness of FIG. 29 from being generated. As described above, when the existence proportion of the angle components of a certain angle α° or more and α°+10' or less is obtained with respect to the angle α° in a range of 0° to 80°, the maximum value is set to 60% or less, preferably 50% or less, more preferably 40% or less. Moreover, when the cross-sectional shape of the elongated lens includes several straight lines, the light is reflected by planes corresponding to the respective straight lines. Accordingly, in a structure in which the function of spreading the light is superior and the reflecting angles mutually largely differ, the light travels in various directions, and the brightness unevenness of FIG. 29 is not easily generated. The preferable shape is a polygonal shape of FIG. 19, and a shape having a straight line whose angle formed with the elongated lens forming surface is about 40°, 30°, 20°, or a shape having a straight line having an angle of about 40°, 30°, 20°, 0° is preferable. Alternatively, the structure of FIG. 20 having the straight line satisfying the condition may be used. In these structures, even when the existence proportion of the angle components of the certain angle α° or more and α°+10° or less is large, the light is reflected in a direction largely different from that of the angle component in the vicinity of α° by the other angle component. Therefore, the brightness unevenness of FIG. 29 is not easily generated.

In the cross-sectional shape of FIGS. 19 and 20, the number of straight lines (sides) is preferably 2 or more and 20 or less, more preferably 3 or more and 15 or less, further preferably 4 or more and 10 or less. When the number of sides is excessively small, the light does not spread in various directions, and therefore the brightness unevenness of FIG. 29 is easily generated. On the other hand, when the number of the sides is excessively large, it becomes difficult to manufacture the light guide having the elongated lens 44a.

Moreover, the light guide having a curved cross-sectional shape in the region in the vicinity of the primary light source of the elongated lens 44a, and a substantially polygonal cross-sectional shape such as a substantially triangular cross-sectional shape of a region adjacent to the above region is preferably used. Concretely, when the existence proportion of the angle components of the certain angle $\alpha°$ or more and $\alpha°+10°$ or less is obtained with respect to the angle $\alpha°$ in the range of 0° to 80° in each of right/left inclined planes of the elongated lens 44a, the light guide is preferably used whose maximum value in the region adjacent to the region in the vicinity of the primary light source is higher than that in the region in the vicinity of the primary light source. Here, the light is spread in the vicinity of the primary light source without generating any brightness unevenness by the elongated lens having a curved cross-sectional shape, the light is condensed by the elongated lens 44a having a substantially polygonal cross-sectional shape such as a substantially triangular cross-sectional shape in the adjacent region, and high luminance can be obtained.

An arrangement pitch of the elongated lens 44a is in a range of preferably 10 to 100 μm, more preferably 10 to 80 μm, and further preferably 20 to 70 μm. It is to be noted that in the present invention, the pitch of the elongated lens 44a may be equal with respect to all the elongated lenses 44a in the above-described range, may be partially different, or may gradually change.

Figure 21:
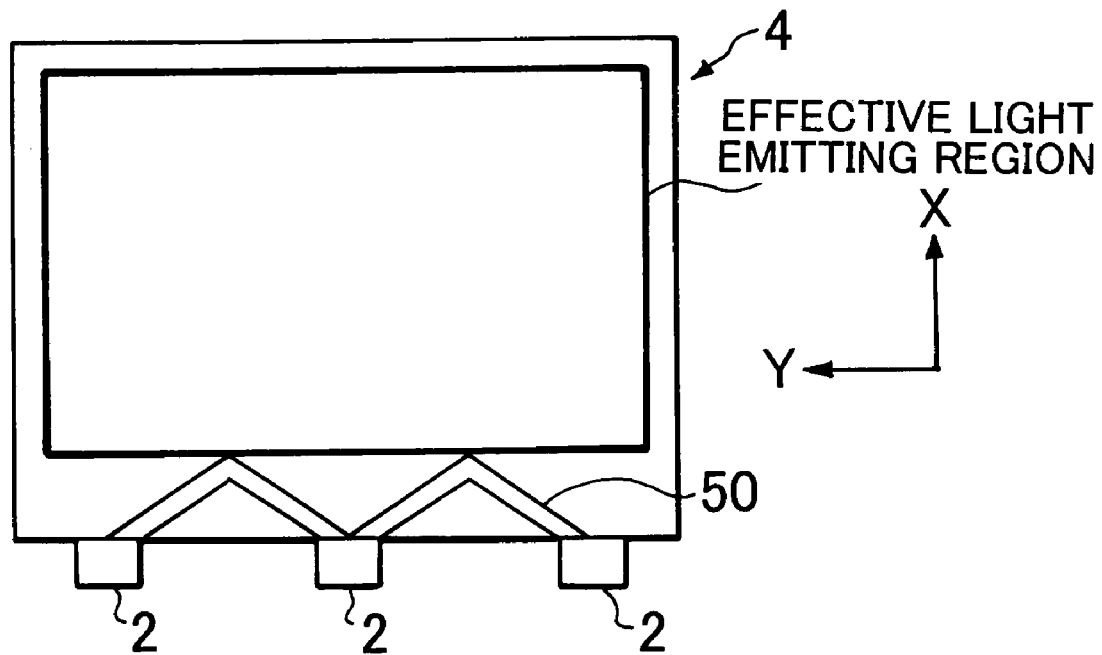
FIG. 21 is a plan view showing the light guide according to the present invention together with the primary light source.

When the necessary spread angle is 110° or more and especially large, it is difficult to sufficiently spread the light only in the elongated lens extending substantially along the direction of the directivity of the light introduced into the light guide. In this case, as shown in FIG. 21, an oblique elongated lens 50 extending in the oblique direction with respect to the direction (X-direction) of the directivity of the introduced light is preferably disposed on the light outputting surface or the back surface of the light guide 4. Especially, the elongated lens preferably extends in a direction substantially equal to the direction corresponding to the necessary spread angle. By the existence of the oblique elongated lens 50, the angle can be changed in such a manner that even the introduced light component forming a large angle to such an extent that the light is not appropriately reflected by the elongated lens 44a is satisfactorily reflected, and the travel direction can be appropriately reflected by the elongated lens 44a. A preferable position in which the oblique elongated lens 50 is formed is a region corresponding to a non-display portion corresponding region between the primary light sources, and preferably a region in which the dark part is observed through the light deflection element 6, for example, the prism sheet in a case where the elongated lens is not formed. The light which is not directed in a direction perpendicular to the elongated prism of the prism sheet exists in this region, and therefore the changing of the travel direction of the light in this region is effective means for reducing the dark part of FIG. 27. In the formed oblique elongated lens, the existence proportion of the angle components of 20° or more and 50° or less, calculated in the same manner as in the above-described elongated lens 44a, is preferably 10% or more and 80 or less. When the existence proportion is excessively small, the function of changing the travel direction of the light lowers. When the proportion is excessively large, a new bright line is generated, and this easily becomes a cause for new brightness unevenness.

Figure 22:
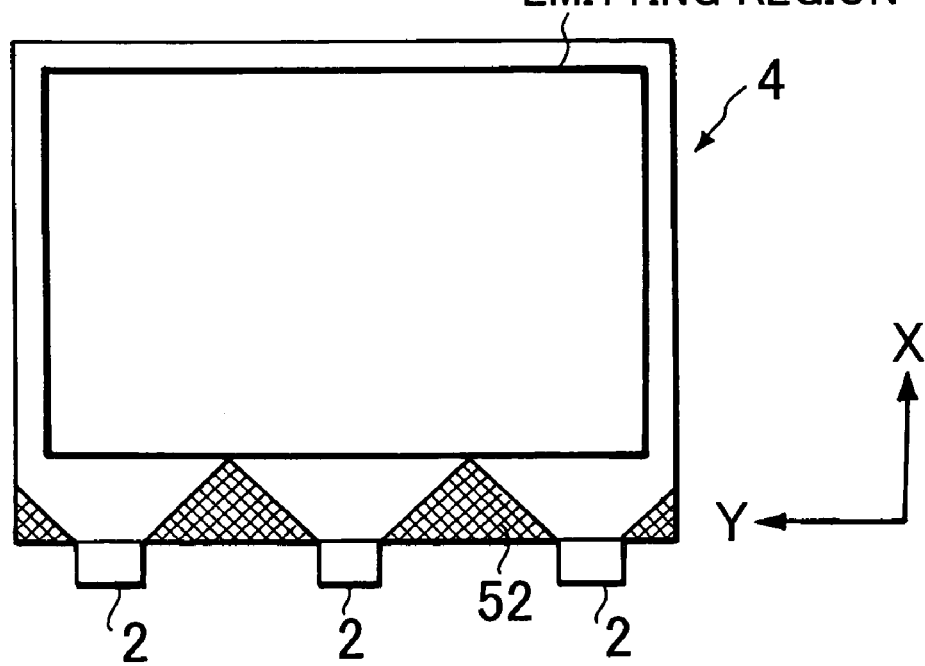
FIG. 22 is a plan view showing the light guide according to the present invention together with the primary light source.

Moreover, for the similar purpose, a dot pattern 52 may be disposed on the light outputting surface or the back surface of the light guide 4 as shown in FIG. 22. The dot pattern 52 may be formed by etching, laser processing or the like. By the existence of the dot pattern 52, the angle can be changed in such a manner that even the incident light component forming a large angle with respect to the direction of the directivity of the introduced light to such an extent that the light is not appropriately reflected by the elongated lens 44a is satisfactorily reflected, and the travel direction can be appropriately reflected by the elongated lens 44a. A preferable position in which the dot pattern is formed is a region corresponding to the non-display portion corresponding region between the primary light sources, and preferably a region in which the dark part is observed through the prism sheet in a case where the pattern is not formed. The light which is not directed in a direction perpendicular to the elongated prism of the prism sheet exists in this region, and therefore the changing of the travel direction of the light in this position is effective means for reducing the dark part of FIG. 27. In the shape of each dot of the formed dot pattern in a cross-sectional surface perpendicular to a straight line connecting the primary light source to the dot, the existence proportion of the angle components of 20° or more and 80° or less, calculated in the same manner as in the above-described elongated lens 44a, is preferably 10% or more and 80% or less. When the existence proportion is excessively small, the function of changing the travel direction of the light lowers. When the proportion is excessively large, a new bright line is generated, and this easily becomes a cause for new brightness unevenness.

Figure 23:
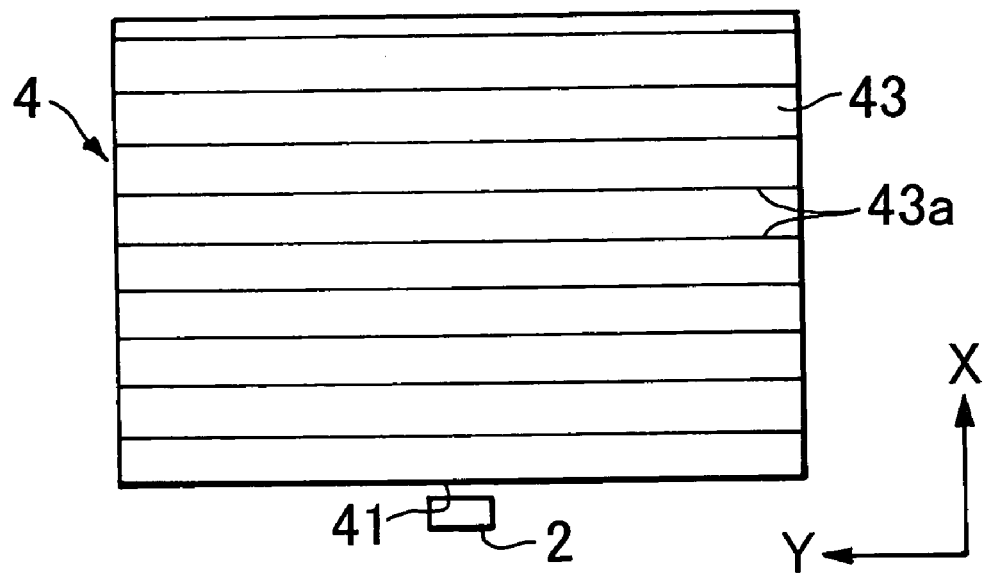
FIG. 23 is a plan view showing the light guide according to the present invention together with the primary light source.

In the present invention, as a light outputting functional structure of the light guide 4, in addition to the above-described rough surface, as shown in FIG. 23, a structure is usable in which a large number of elongated lenses such as elongated prisms, lenticular elongated lenses, V-shaped grooves and the like are formed extending in a direction (Y-direction) perpendicular to the direction of the directivity of the light applied to the light guide 4 from the LED 2 or a direction (X-direction) substantially parallel to the directivity direction, and in parallel to one another. It is to be noted that the elongated lens in this case is not limited to a linear shape, and may have a curved shape in such a manner as to surround the LED 2.

In the rough surface or the elongated lens forming surface which is the light outputting functional structure, an average inclination angle $\theta a$ by ISO4287/1-1984, measured in the direction of the directivity of the light applied to the light guide, is preferably set to a range of 0.2° to 20° in order to obtain a well-balanced luminance in the light outputting surface 43. The average inclination angle $\theta a$ is in a range of further preferably 0.3° to 12°, especially preferably 0.5° to 8°. This average inclination angle $\theta a$ is preferably set to an optimum range by a ratio (L/t) of a length (L) in a direction in which the incident light travels to a thickness (t) of the light guide 4. That is, when the light guide 4 having L/t of 100 or more is used, the average inclination angle $\theta a$ is set to a range of preferably 0.2° to 10°, further preferably 0.3° to 8°, more preferably 0.5° to 6°. In the use of the light guide 4 having a L/t which is less than 100, the average inclination angle $\theta a$ is set to a range of preferably 0.5° to 20°, further preferably 0.8° to 15°, more preferably 1° to 10°.

When the elongated lens extending in the Y-direction is used as the light outputting functional structure, elongated lenses 43a for use in this purpose have an arrangement pitch in a range of preferably 10 μm to 100 μm, more preferably 20 μm to 80 μm, further preferably 30 μm to 70 μm, and an apex angle is in a range of preferably 140° to 179.6°, more preferably 156° to 179.4°, especially preferably 164° to 179°.

The average inclination angle θa of the rough surface or the elongated lens which is the light outputting functional structure formed in the light guide 4 can be obtained from an inclination function f(x) obtained assuming that a coordinate in a measurement direction is x and using the following equations (1) and (2), when a rough surface shape is measured using a probe type surface roughness gauge in accordance with ISO4287/1-1984. Here, L denotes a measurement length, and Δa is tangent of the average inclination angle ƒa.

$$\Delta a=(1/L)\int_0^L |(d/dx)f(x)|dx \quad (1)$$

$$\theta a=\tan^{-1}(\Delta a) \quad (2)$$

Moreover, as the light outputting functional structure of the light guide, a substance having a refractive index different from that of a main component of the light guide may be allowed to exist in the light guide. As the substance having the different refractive index, a particulate substance may be dispersed in the light guide, or a layer having a different refractive index may be disposed on the surface of the light guide or inside the light guide. In the substance having the different refractive index, a difference of the refractive index from that of the main component of the light guide is preferably 0.002 or more and 0.3 or less, more preferably 0.005 or more and 0.2 or less, further preferably 0.01 or more and 0.1 or less. As the shape of the substance having the different refractive index, the particulates are especially preferable, and they are preferably dispersed in the light guide, from a viewpoint of ease of manufacturing. Examples of the particulates include silicon-based particulates, styrene-based particulates or copolymer thereof, acrylic particulates or copolymer thereof, inorganic particulates and the like. Concentration of the particulates is preferably 0.01 wt % or more and 10 wt % or less, more preferably 0.1 wt % or more and 5 wt % or less, further preferably 0.2 wt % or more and 3 wt % or less.

Furthermore, as the light guide 4, a light outputting rate is in a range of preferably 0.5% to 5%, more preferably 1% to 3%. When the light outputting rate is smaller than 0.5%, a quantity of light output from the light guide 4 decreases, and there is a tendency that sufficient luminance cannot be obtained. When the light outputting rate is larger than 5%, a large quantity of light is output in the vicinity of the primary light source 2, the light is remarkably decays in the X-direction in the light outputting surface 43, and uniformity of the luminance in the light outputting surface 43 tends to drop. When the light outputting rate of the light guide 4 is set to 0.5% to 5%, an angle formed by the direction of peak light output from the light outputting surface with the light outputting surface is 10° to 40°, and a half-value width of the output light distribution in a plane perpendicular to the light outputting surface 43 including the Y-direction is 10° to 40°. The light having output characteristics of the high directivity can be output from the light guide 4, the output direction thereof can be efficiently deflected by the light deflection element 6, and the surface light source device having the high luminance can be provided.

In the present invention, the light outputting rate from the light guide 4 is defined as follows. A relation between light intensity ($I_0$) of the output light of the light outputting surface 43 on the side of the light incident end surface 41 and output light intensity (I) in a position having a distance L from the end surface satisfies a relation as in the following equation (3), assuming that the thickness (Z-direction dimension) of the light guide 4 is t.

$$I=I_0 \cdot \alpha(1-\alpha)^{L/t} \quad (3),$$

where constant α denotes the light outputting rate, and is a rate (%) of the light output from the light guide 4 per unit length (length corresponding to the light guide thickness t) in the X-direction in the light outputting surface 43. This light outputting rate a can be obtained from gradient, when a logarithm of light intensity of output light from the light outputting surface 43 is plotted on the ordinate, and (L/t) is plotted on the abscissa.

The light outputting functional structure may be disposed in such a manner that the light outputting rate in the light outputting surface 43 of the light guide 4 indicates a non-uniform distribution. For example, when the rough surface is used as the light outputting functional structure, a roughening process is performed in such a manner as to obtain a non-uniform distribution of the surface roughness in the light outputting surface 43, so that the non-uniform distribution of the outputting rate can be formed.

When the outputting rate is set to be non-uniform, the brightness unevenness can be reduced. The average inclination angle of the light outputting functional structure of the light guide is set to be large in a region in which a luminance drop occurs at a time when the light deflection element, light reflection element, and primary light source are disposed and normal luminance is measured in a state in which the light outputting functional structure is uniform in the whole effective light emitting region. The angle is set to be small in a region in which the luminance rises, and accordingly the brightness unevenness can be reduced. This technique is suitable for reducing the brightness unevenness which is light to such an extent as to remain, even when the degree of the rough surface of the elongated lens 44a or the light incident end surface is set to be proper.

Alternatively, to partially roughen the elongated lens 44a, the outputting rate of the light outputting functional structure disposed on an opposite surface is set to be low in a position in which a roughening degree of the elongated lens 44a is large, and set to be high in a position in which the roughening degree is small, and accordingly the normal luminance can be uniform.

In the present invention, as described above, the light outputting functional structure is preferably formed in the light outputting surface 43 of the light guide 4, and the main surface (back surface) on an opposite side is preferably formed into the elongated lens forming surface on which the elongated lens 44a is formed. However, in the present invention, the light outputting surface is constituted as the surface for forming the elongated lens 44a, and the light outputting functional structure may be formed on the main surface on the opposite side.

Figure 24:
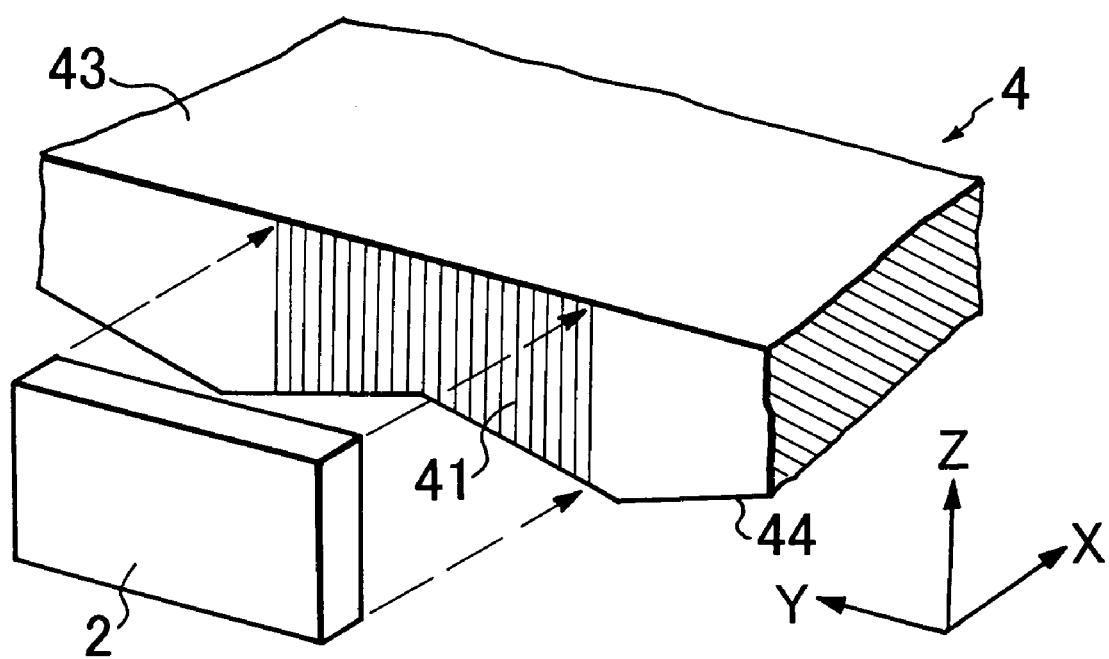
FIG. 24 is a partially exploded perspective view showing the light guide according to the present invention together with the primary light source.

FIG. 24 is a partially exploded perspective view showing a part of the light guide for the surface light source device according to the present invention together with the LED. In the present embodiment, the light incident end surface 41 is constituted of an anisotropic rough surface. The average inclination angle θa of the anisotropic rough surface in the Y-direction along the light outputting surface 43 is larger than that in the Z-direction perpendicular to the light outputting surface 43. When such a rough surface is formed, the distribution of the light emitted from the LED 2 and entering the light guide 4 through the light incident end surface 41 in the XY-plane can be broadened. Accordingly, excessive light output from the light guide 4 in the vicinity of the light incident end surface based on the excessive broadening of the distribution in the XZ-plane is prevented, the light having desired intensity can be efficiently guided into the broad region of the light outputting surface 43, and this can contribute to enhancement of uniformity of luminance.

In the anisotropic rough surface of the light incident end surface 41, the average inclination angle in the Y-direction along the light outputting surface 43 is preferably 3° to 30°, further preferably 4° to 25°, especially preferably 5° to 20°. When the average inclination angle is less than 3°, the above-described function/effect tends to be reduced. When the average inclination angle exceeds 30°, the distribution of the light in the XY-plane does not spread, and the luminance tends to drop. To obtain the above-described function/effect, the average inclination angle in the Z-direction perpendicular to the light outputting surface 43 is 5° or less, especially preferably 3° or less. Furthermore, in the anisotropic rough surface of the light incident end surface 41, the length of the region having the inclination angle of 8° or more in the measurement in a direction along the light outputting surface 43 is preferably 5% or less of a total measured length. When the length of the region having an inclination angle of 8° or more exceeds 5% of the total measured length, there is a tendency that the luminance drop is caused by excessive light output from the light guide 4 in the vicinity of the light incident end surface based on the excessively broadening of the distribution of the light in the XY-plane.

As the anisotropic rough surface, a substantially mutually parallel regular or irregular concave/convex structure substantially extending in the Z-direction is preferable. More concretely, examples include substantially mutually parallel elongated lenses extending substantially in the Z-direction, or roughened elongated lens.

The light guide 4 of the present invention can be made of a synthetic resin having a high transmittance. The examples of the synthetic resin include a methacrylic resin, acrylic resin, polycarbonate-based resin, polyester-based resin, vinyl chloride-based resin, and cyclic polyolefin resin. Especially the methacrylic resin is superior in transmittance, resistance to heat, kinetic property, and formability, and optimum. As the methacrylic resin, there can be used the resin preferably containing methyl methacrylate as a main component at 80% by weight or more. To form the surface structure of the rough surface of the light guide 4, the surface structure of the elongated prism or the like, or the anisotropic rough surface structure of the light incident end surface, a transparent synthetic resin plate may be formed by thermal pressing using a mold member having a desired surface structure, and the shape may be imparted by screen printing, extrusion, injection or the like simultaneously with the forming. The structure surface may be formed using a thermally or optically hardening resin or the like.

A method of forming the mold member will be described. The examples of a method of partially changing the shape of the elongated lens 44a formed on the light guide of the present invention include: a method of blasting a part or all of the mold having a elongated lens shape transfer surface formed by cutting, etching or the like; a method of polishing a part of all of the mold having the elongated lens shape surface to transfer the shape; a method of blasting a part or all of a formed material formed/obtained using a first mold having the elongated lens shape transfer surface, and transferring the shape again to thereby obtain a second mold having the elongated lens shape transfer surface and the like. By these methods, or by a direct blasting process for forming a blast trace on at least a part of the elongated lens forming surface of the light guide 4, the histogram of the cross-sectional shape of the elongated lens 44a or the valley portion inclination angle can be changed.

Moreover, the examples of a method of forming the elongated lens or the rough surface of the light outputting functional structure of the light guide, or a method of forming an anisotropic rough surface structure of the light incident end surface include: mold cutting or etching; blasting; and a method combined with these methods. A method in which the surface is roughened by the blasting after cutting the mold is especially preferably used.

Various lens shapes formed on the light deflection element 6 are used in accordance with purposes, and the examples include a prism shape, lenticular lens shape, fly eye lens shape, corrugated shape and the like. Above all, a prism sheet on which a large number of elongated prisms each having a substantially triangular cross-sectional shape are arranged is especially preferable. The apex angle of the elongated prism is in a range of preferably 50° to 80°, more preferably 55° to 70°.

The light deflection element 6 of the present invention can be made of a synthetic resin having a high transmittance. The examples of the synthetic resin include a methacrylic resin, acrylic resin, polycarbonate-based resin, polyester-based resin, vinyl chloride-based resin, and cyclic polyolefin resin. Especially the methacrylic resin is superior in transmittance, resistance to heat, kinetic property, and formability, and optimum. As the methacrylic resin, there can be used the resin preferably containing methyl methacrylate as a main component at 80% by weight or more. To form the surface structure of the elongated prism of the light deflection element 6 or the like, the transparent synthetic resin plate may be formed by thermal pressing using a mold member having a desired surface structure, or the shape may be imparted by screen printing, extrusion, injection or the like simultaneously with the forming. The structure surface may be formed using a thermally or optically curing resin or the like. These mold members may be obtained by mold cutting, etching or the like. Furthermore, a rough surface structure or a elongated lens arrangement structure formed of an active energy ray hardening resin may be formed on the surface of a transparent substrate of a transparent film, sheet or the like formed of a polyester-based resin, acrylic resin, polycarbonate-based resin, vinyl chloride-based resin, polymethacrylic imide-based resin or the like, or the sheet may be bonded/integrated onto a separate transparent substrate by methods such as adhesion and fusion bond. As the active energy ray curing resin, a multifunctional (meth) acrylic compound, vinyl compound, (meth)acrylic acid esters, aryl compound, metal salt of (meth)acrylic acid or the like is usable.

As the light reflection element 8, a plastic sheet having a metal evaporated reflective layer on the surface is usable. In the present invention, instead of a reflective sheet, a light reflective layer or the like formed on a main surface 44 on the side opposite to the light outputting surface of the light guide 4 by metal evaporation or the like is usable as the light reflection element 8. It is to be noted that reflective members are preferably applied also to four side end surfaces of the light guide 4 (excluding the light incident end surface 41).

Figure 25:
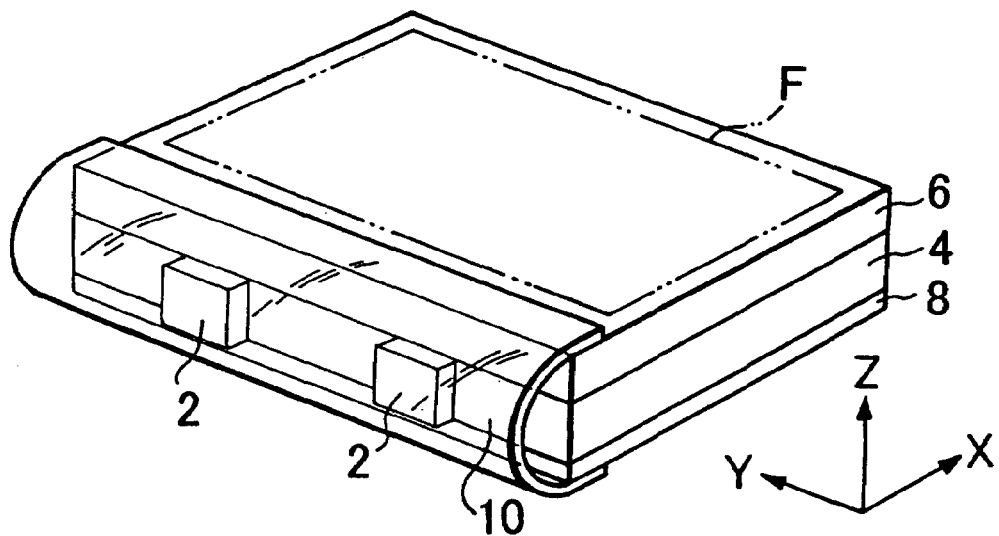
FIG. 25 is a perspective view showing the surface light source device according to the present invention.

FIG. 25 is a perspective view showing another embodiment of the surface light source device according to the present invention. In the present embodiment, two LEDs 2 are disposed adjacent to the above-described light incident end edge of the light guide 4 and at an appropriate distance in the Y-direction. These two LEDs are disposed in such a manner that the directions of the maximum-intensity light in the light emitted from the LEDs turn to the X-direction, and extend in parallel to each other (this also applies to the above-described embodiment).

A reflective sheet 10 having a light diffusion property is attached in such a manner as to cover an end surface portion of a laminate of the light deflection element 6, light guide 4, and light reflection element 8, and the LED 2 in a region other than an effective light emitting region F. Accordingly, the light output from the end surface portion of the laminate of the light guide 4, light deflection element 6, and light reflection element 8, and the light leaking from a case of the LED 2 is satisfactorily diffused in the XY-plane, reflected, and can enter the light guide 4 again. The light having a desired intensity can be guided to a broad region of the light guide light outputting surface 43, and this can contribute to enhancement of the uniformity of the luminance.

A distance between the primary light source like the LED 2 and the light incident end surface 41 is preferably set to 0.2 mm or less. When the distance between the primary light source and the light incident end surface exceeds 0.2 mm, the luminance drop tends to easily occur.

Figure 26:
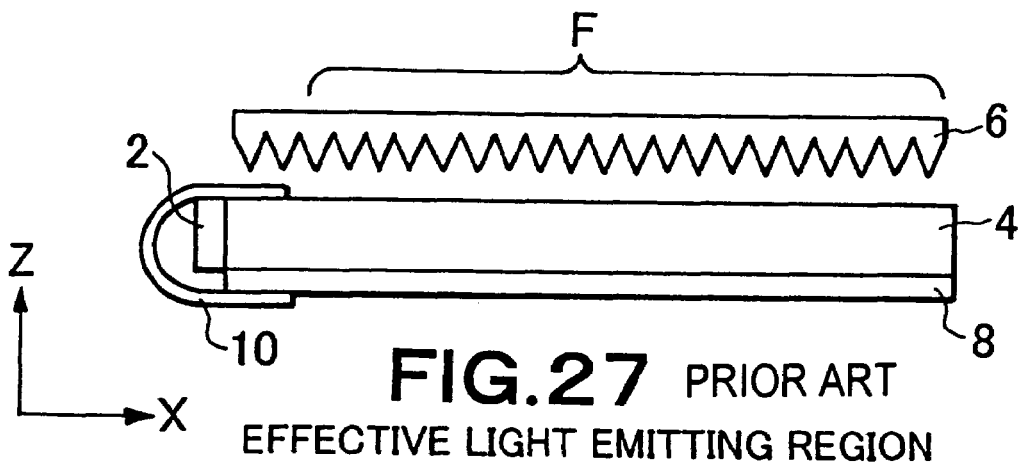
FIG. 26 is a cross-sectional view showing the surface light source device according to the present invention.

FIG. 26 is a cross-sectional view showing another embodiment of the surface light source device according to the present invention. In the present embodiment, a reflective sheet 10 having a light diffusion property is attached in such a manner as to cover the end surface portion of the laminate of the light guide 4 and light reflection element 8, and the LED 2 in a region other than an effective light emitting region F. The light deflection element 6 is disposed on the sheet. Accordingly, a function/effect similar to that of the embodiment of FIG. 25 can be obtained, and a higher luminance can be obtained.

A liquid crystal display element is disposed on a light emitting surface (light exit surface 62 of the light deflection element 6) of the surface light source device constituted of the LED 2, light guide 4, light deflection element 6, and light reflection element 8 to thereby constitute a liquid crystal display device.

Figure 35:
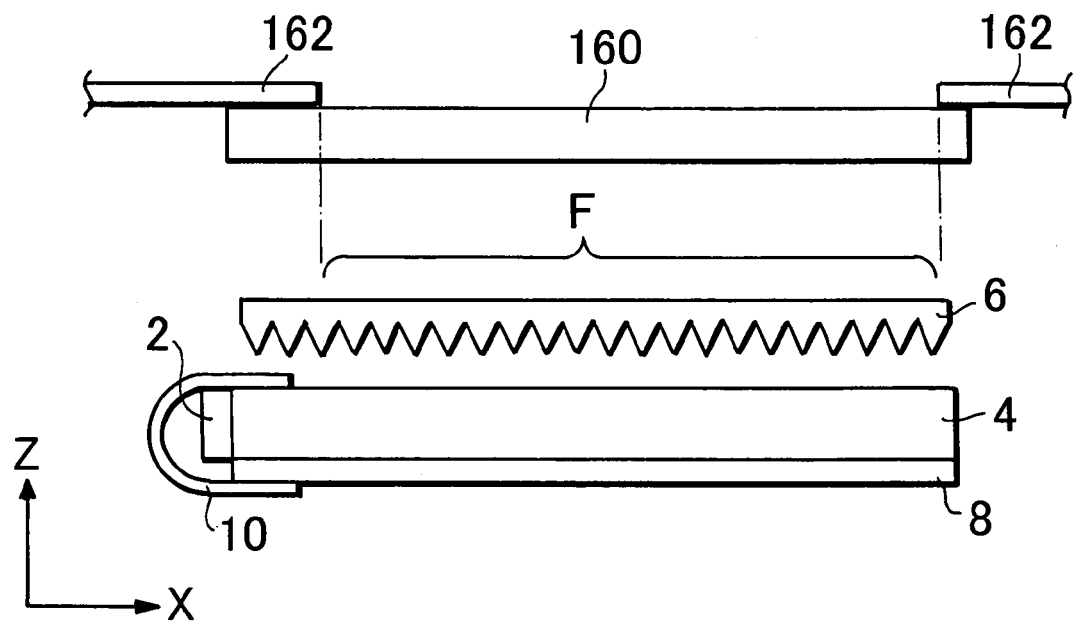
FIG. 35 is a schematic partially exploded cross-sectional view of a liquid crystal display device using the surface light source device according to the present invention.

FIG. 35 is a schematic partially cross-sectional view of the above-described liquid crystal display device. In FIG. 35, a liquid crystal display element 160 is disposed on the light deflection element 6 substantially in parallel to the light deflection element 6, and outer peripheral edge portions of the liquid crystal display element 160 are covered with frame members 162. Therefore, a display screen (effective display screen) which is effective during observation of the liquid crystal display element 160 from above is a region corresponding to the effective light emitting region F of the surface light source device. In other words, the effective light emitting region F of the surface light source device is set as a region corresponding to the effective display screen during the observation of the liquid crystal display element 160.

EXAMPLES

Examples and comparative examples of the present invention will be described. It is to be noted that in the examples and comparative examples, to measure a micro region inclination angle of a light guide cross-sectional shape, a replica of a elongated lens forming surface of a light guide was prepared, the replica was cut by the surface perpendicular to an extending direction of a elongated lens, and the measurement was performed based on a cross-sectional shape line obtained by enlargement of a cut end surface with an optical microscope, electron microscope or another image pickup means. Calculation of a histogram or degree distribution of an absolute value of the micro region inclination angle, and calculation of a valley portion inclination angle were performed in the same manner as described above with reference to FIGS. 6A and 6B. Additionally, when the cross-sectional shape was equally divided to set the micro regions as described above, the measuring of a coordinate of the cross-sectional shape is sometimes complicated. In this case, the calculation can be easily performed in the following method.

First, the cut end surface was divided into parts in such a manner that the parts are equal in Y-coordinate length, and the micro regions were set to the parts. Thereafter, the degree distribution of the absolute value of the micro region inclination angle was calculated concerning the micro regions having equal Y-coordinate length in the same manner as described above. A degree/[cosine (Cos) of inclination angle] of each inclination angle of the calculated degree distribution was obtained. Next, a total sum of the degree/[cosine (Cos) of inclination angle] was obtained. Next, {degree/[cosine (Cos) of inclination angle]}/total sum was obtained with respect to each inclination angle. This value indicates the degree distribution at a time when the cross-sectional shape is equally divided to set the micro regions.

An average inclination angle was measured by a probe type surface roughness gauge (SURFCOM 570A Type manufactured by TOKYO SEIKI Co., Ltd.) using a 1 μmR, 55° conical diamond needle (010-2528) as a probe at a driving speed of 0.03 mm/second. A measurement length was set to 2 mm. After correcting inclination of an average line of an extracted curved line, a center line average value of the curved line obtained by differentiating the curved line was obtained following the above-described equations (1) and (2). A half-value width distance of a luminance distribution at a time of turning-on of one primary light source was measured as described above with reference to FIG. 11. Furthermore, brightness unevenness was judged by visual inspection of an image obtained by photographing the light emitting surface of a surface light source device from a distance of 280 mm by a CCD camera.

Example 1

The surface of a stainless steel plate worked into a mirror surface and having an effective area of 34 mm×48 mm, and a thickness of 3 mm was partially roughened by a blasting process performed with respect to a region excluding a region of 3.5 mm from a side having a length of 34 mm, using glass beads having a particle diameter of 53 μm or less (FGB-400 manufactured by Fuji Seisakusho Co., Ltd.), and setting a distance from the stainless steel plate to a blowing nozzle was 32 cm and a blowing pressure was 5 kgf/cm². Accordingly, a first mold having a shape transfer surface which was partially a rough surface was obtained.

On the other hand, a symmetrical lens pattern in which elongated lenses having a pitch of 50 μm were arranged in parallel to a side having a length of 48 mm was formed on the surface of a brass plate worked into a mirror surface and having an effective area of 34 mm×48 mm and a thickness of 3 mm by cutting. Accordingly, a second mold having the shape transfer surface (concave curved surface) of a lens pattern was obtained. The shape transfer surface of the lens pattern was partially roughened by a blasting process performed with respect to the region excluding the region of 3.5 mm from the side of the second mold having a length of 34 mm, using the glass beads having a particle diameter of 53

μm or less (FGB-400 manufactured by Fuji Seisakusho Co., Ltd.), at a distance of 32 cm at a blowing pressure of 2 kgf/cm².

Injection was performed using the above-described first and second molds, and a transparent acrylic resin plate was prepared having a rectangular shape having a short side of 34 mm and a long side of 48 mm, and a wedge shape whose thickness changed from 0.8 mm (non-roughened side end portion) to 0.6 mm (roughened side end portion) along the long side. One main surface of the plate was a light outputting surface constituted of rough and flat surface portions having an average inclination angle of 3.0°, and the other main surface was constituted of a elongated lens forming surface.

An anisotropic roughening process was performed with respect to the end surface of the transparent acrylic resin plate on the side of a 0.8 mm thick short side using sand paper, and the light incident end surface was formed having an average inclination angle of 9° (rate of a region having an inclination angle of 8° or more was 1%) in a direction along the main surface, and an average inclination angle of 0.5° in a direction substantially perpendicular to the main surface.

Three LEDs (NSCW215biR manufactured by Nichia Kagaku Kogyo Co., Ltd.) were arranged at an interval of 10.0 m in such a manner as to face the short-side end surface (light incident end surface) of the light guide having a thickness of 0.8 mm. A light diffusing reflective sheet (SU-119 manufactured by Tsujimoto Denki Seisakusho Co., Ltd.) was disposed on the elongated lens forming surface of the light guide, a prism sheet (M165 manufactured by Mitsubishi Rayon Co., Ltd.) having a large number of elongated prisms formed in parallel to each other at an apex angle of 65° and a pitch of 50 μm was disposed on the side of the light outputting surface in such a manner that a prism forming surface faces the light guide, and a surface light source device was prepared.

This surface light source device was combined with a liquid crystal display element in order to constitute a liquid crystal display device having an effective light emitting region dimension of 31 mm×42 mm, and having a distance of 4 mm from the light guide light incident end surface to the effective light emitting region, and a necessary spread angle was 103°.

The average inclination angle of the light outputting surface of the obtained light guide was 0° in a region of 3.5 mm from the light incident end surface, and 3.0° in the other region.

The cross-sectional shape of the elongated lens forming surface of the obtained light guide was as follows.

(Region A: region of 3.5 mm from light incident end surface)
Outward convex curved line
Degree distribution of inclination angle absolute values:
20° or more and 50° or less - - - 67%
25° or more and 50° or less - - - 51%
30° or more and 50° or less - - - 39%
35° or more and 50° or less - - - 26%
40° or more and 50° or less - - - 8%
15° or less - - - 33%
35° or more and 60° or less - - - 26%
40° or more and 60° or less - - - 8%
Maximum value of ratio of α° or more and α°+10° or less: 31% (α°=31°)
Valley portion inclination angle: 31°
(Region B: region other than region A)
Outward convex curved line
Degree distribution of inclination angle absolute values:
30° or more and 50° or less - - - 26%
Valley portion inclination angle: 12°

A luminance distribution half-value width distance at a time of turning-on of a middle primary light source only was 11 mm.

Figure 34:
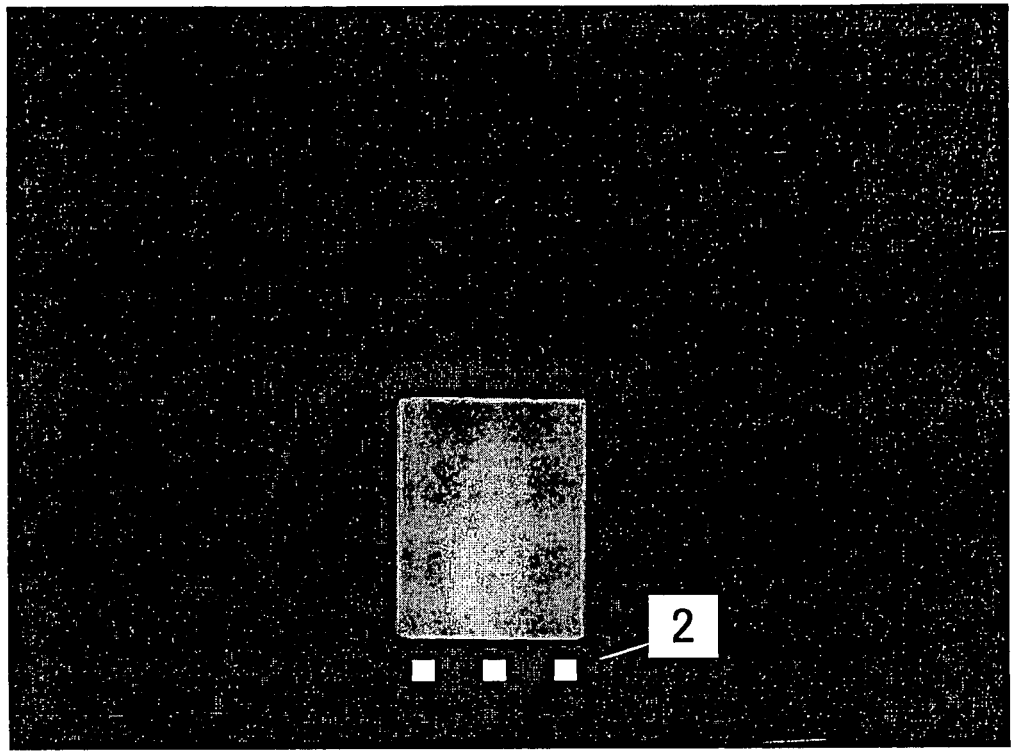
FIG. 34 is a diagram showing an example of a luminance distribution in the surface light source device according to the present invention.

All the primary light sources were turned on, the surface light source device was allowed to emit the light, and the brightness unevenness of the effective light emitting region was judged. An image photographed by the CCD camera is shown in FIG. 34. Any of a dark part of FIG. 27, a streaked bright line of FIG. 29, a bright part by distribution overlap of light sources of FIG. 30, and a streaked bright line of FIG. 32 was not observed.

Example 2

This example was performed in the same manner as in Example 1 except that a blasting process of a first mold was performed with respect to a region excluding a region of 3.0 mm from a side having a length of 34 mm, a blowing pressure in this case was changed in a range of 4 kgf/cm² to 6 kgf/cm², a blasting process of a second mold was performed with respect to the region excluding the region of 3.0 mm from the side having a length of 34 mm, and a blowing pressure in this case was set to 1.5 kgf/cm².

An average inclination angle of a light outputting surface of an obtained light guide was 0° in a region of 3.0 mm from a light incident end surface, and 2.5° to 3.5° in the other region, and a middle portion of an effective light emitting region had a maximum value.

The cross-sectional shape of the elongated lens forming surface of the obtained light guide was as follows.

(Region A: region of 3.0 mm from light incident end surface)
Outward convex curved line
Degree distribution of inclination angle absolute values:
20° or more and 50° or less - - - 67%
25° or more and 50° or less - - - 51%
30° or more and 50° or less - - - 39%
35° or more and 50° or less - - - 26%
40° or more and 50° or less - - - 8%
15° or less - - - 33%
35° or more and 60° or less - - - 26%
40° or more and 60° or less - - - 8%
Maximum value of ratio of α or more and α°+10° or less: 31% (α°=31°)
Valley portion inclination angle: 31°
(Region B: region other than region A)
Outward convex curved line
Degree distribution of inclination angle absolute values:
30° or more and 50° or less - - - 29%
Valley portion inclination angle: 12°

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

Example 3

This example was performed in the same manner as in Example 2 except that a blasting process of a first mold was first performed with respect to a region excluding a region of 3.0 mm from a side having a length of 34 mm to with a blowing pressure of 3 kgf/cm², next the process was performed with respect to the surface excluding the region of 8.0 mm from the side having the same length of 34 mm while changing the blowing pressure in a range of 4 kgf/cm² to 6 kgf/cm², and the blasting process of a second mold was performed with respect to the region excluding the region of 3.0 mm to 8.0 mm from the side having a length of 34 mm.

An average inclination angle of a light outputting surface of an obtained light guide was 0° in a region of 3.0 mm from a light incident end surface, 2.0° in a region of 3.0 mm to 8.0 mm from the light incident end surface, and 2.5° to 3.5° in the other region, and a middle portion of an effective light emitting region had a maximum value.

The cross-sectional shape of the elongated lens forming surface of the obtained light guide was as follows.

(Region A: region of 3.0 mm from light incident end surface)
Outward convex curved line
Degree distribution of inclination angle absolute values:
20° or more and 50° or less - - - 67%
25° or more and 50° or less - - - 51%
30° or more and 50° or less - - - 39%
35° or more and 50° or less - - - 26%
40° or more and 50° or less - - - 8%
15° or less - - - 33%
35° or more and 60° or less - - - 26%
40° or more and 60° or less - - - 8%
Maximum value of ratio of α° or more and α°+10° or less: 31% (α°=31°)
Valley portion inclination angle: 31°
(Region B: region other than region A)
Outward convex curved line
Degree distribution of inclination angle absolute values:
30° or more and 50° or less - - - 29%
Valley portion inclination angle: 12°

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

Example 4

The surface of a stainless steel plate worked into a mirror surface and having an effective area of 65 mm×65 mm, and a thickness of 3 mm was partially roughened by a blasting process performed with respect to a region excluding a region of 5.0 mm from one side, using glass beads having a particle diameter of 53 μm or less (FGB-400 manufactured by Fuji Seisakusho Co., Ltd.), and setting a distance from the stainless steel plate to a blowing nozzle to 32 cm, and a blowing pressure to 4 kgf/cm² to 6 kgf/cm². Accordingly, a first mold having a shape transfer surface which was partially a rough surface was obtained.

On the other hand, a symmetrical lens pattern having a shape different from that of Example 1, in which elongated lenses having a pitch of 50 μm were arranged in parallel to one side, was formed on the surface of a brass plate worked into a mirror surface and having an effective area of 65 mm×65 mm and a thickness of 3 mm by cutting. Accordingly, a second mold having the shape transfer surface (concave curved surface) of the lens pattern was obtained.

Injection was performed using the above-described first and second molds, and a transparent acrylic resin plate was prepared having a rectangular shape having one side of 65 mm, and a wedge shape whose thickness changed from 0.9 mm (non-roughened side end portion) to 0.7 mm (roughened side end portion) along a long side. One main surface of the plate was a light outputting surface constituted of rough and flat surface portions having an average inclination angle of 2.5° to 3.5°, and the other main surface was constituted of a elongated lens forming surface.

An anisotropic roughening process was performed with respect to the end surface of the transparent acrylic resin plate on the side of a 0.9 mm thick side using sand paper, and the light incident end surface was formed having an average inclination angle of 4° (rate of a region having an inclination angle of 8° or more was 0.5%) in a direction along the main surface, and an average inclination angle of 0.3° in a direction substantially perpendicular to the main surface.

Seven LEDs (NSCW215biR manufactured by Nichia Kagaku Kogyo Co., Ltd.) were arranged at an interval of 8.5 mm in such a manner as to face the end surface (light incident end surface) of the light guide on the side of a side having a thickness of 0.9 mm. A light diffusing reflective sheet (SU-119 manufactured by Tsujimoto Denki Seisakusho Co., Ltd.) was disposed on the elongated lens forming surface of the light guide, a prism sheet (M165 manufactured by Mitsubishi Rayon Co., Ltd.) having a large number of elongated prisms formed in parallel to each other at an apex angle of 65° and a pitch of 50 μm was disposed on the side of the light outputting surface in such a manner that a prism forming surface faces the light guide, and a surface light source device was prepared.

This surface light source device was combined with a liquid crystal display element in order to constitute a liquid crystal display device having an effective light emitting region dimension of 60 mm×60 mm, and having a distance of 5.5 mm from the light guide light incident end surface to the effective light emitting region, and a necessary spread angle was 75°.

The average inclination angle of the light outputting surface of the obtained light guide was 0° in a region of 5.0 mm from the light incident end surface, and 2.5° to 3.5° in the other region, and a middle portion of the effective light emitting region had a maximum value.

The cross-sectional shape of the elongated lens forming surface of the obtained light guide was as follows.
Outward convex curved line
Degree distribution of inclination angle absolute values:
20° or more and 50° or less - - - 63%
25° or more and 50° or less - - - 55%
30° or more and 50° or less - - - 46%
35° or more and 50° or less - - - 36%
40° or more and 50° or less - - - 25%
15° or less - - - 30%
35° or more and 60° or less - - - 36%
40° or more and 60° or less - - - 25%
Maximum value of ratio of α° or more and α°+10' or less: 37% (α°=34°)
Valley portion inclination angle: 42°

A luminance distribution half-value width distance at a time of turning-on of a middle primary light source only was 9 mm.

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

Example 5

This example was performed in the same manner as in Example 4 except that the same shape as that before performing the blasting of Example 1 was used as a shape transfer surface of a symmetrical lens pattern of a second mold, a blasting process was performed with respect to a region excluding a region of 4.0 mm from one side of a second mold using glass beads having a particle diameter of 53 µm or less (FGB-400 manufactured by Fuji Seisakusho Co., Ltd.) with a blowing pressure of 2.0 kgf/cm² at a distance of 32 cm, and a elongated lens forming surface was partially roughened.

An average inclination angle of a light outputting surface of an obtained light guide was 0° in a region of 5.0 mm from a light incident end surface, and 2.5° to 3.5° in the other region, and a middle portion of an effective light emitting region had a maximum value.

The cross-sectional shape of the elongated lens forming surface of the obtained light guide was as follows.

(Region A: region of 4.0 mm from light incident end surface)
Outward convex curved line
Degree distribution of inclination angle absolute values:
20° or more and 50° or less - - - 67%
25° or more and 50° or less - - - 51%
30° or more and 50° or less - - - 39%
35° or more and 50° or less - - - 26%
40° or more and 50° or less - - - 8%
15° or less - - - 33%
35° or more and 60° or less - - - 26%
40° or more and 60° or less - - - 8%
Maximum value of ratio of $\alpha°$ or more and $\alpha°+10'$ or less: 31% ($\alpha°=31°$)
Valley portion inclination angle: 31°
(Region B: region other than region A)
Outward convex curved line
Degree distribution of inclination angle absolute values:
30° or more and 50° or less - - - 26%
Valley portion inclination angle: 12°

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

Example 6

This example was performed in the same manner as in Example 4 except that a shape of a shape transfer surface (concave curved surface) of a symmetrical lens pattern was changed.

An average inclination angle of a light outputting surface of an obtained light guide was 0° in a region of 5.0 mm from a light incident end surface, and 2.5° to 3.5° in the other region, and a middle portion of an effective light emitting region had a maximum value.

The cross-sectional shape of the elongated lens forming surface of the obtained light guide was as follows.
Outward convex curved line
Degree distribution of inclination angle absolute values:
20° or more and 50° or less - - - 61%
25° or more and 50° or less - - - 38%
30° or more and 50° or less - - - 26%
35° or more and 50° or less - - - 19%
40° or more and 50° or less - - - 10%
15° or less - - - 33%
35° or more and 60° or less - - - 19%
40° or more and 60° or less - - - 10%
Maximum value of ratio of $\alpha°$ or more and $\alpha°+10°$ or less: 35% ($\alpha°=250$)
Valley portion inclination angle: 12°

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

Example 7

This example was performed in the same manner as in Example 1 except that, instead of performing a partial blasting process with respect to a first mold, the same region was treated by cutting, so that a transfer structure for forming a large number of elongated prisms having an apex angle of 168° and a pitch of 30 µm and extending in a direction parallel to a side of a length of 34 mm was formed, and a shape [portion corresponding to a region B] of a shape transfer surface of a symmetrical lens pattern was changed.

An average inclination angle of a light outputting surface of an obtained light guide was 0° in a region of 3.5 mm from a light incident end surface, and 6.0° in the other region.

The cross-sectional shape of the elongated lens forming surface of the obtained light guide was as follows.

(Region A: region of 3.5 mm from light incident end surface)
Outward convex curved line
Degree distribution of inclination angle absolute values:
20° or more and 50° or less - - - 67%
25° or more and 50° or less - - - 51%
30° or more and 50° or less - - - 39%
35° or more and 50° or less - - - 26%
40° or more and 50° or less - - - 8%
15° or less - - - 33%
35° or more and 60° or less - - - 26%
40° or more and 60° or less - - - 8%
Maximum value of ratio of $\alpha°$ or more and $\alpha°+10°$ or less: 31% ($\alpha°=31°$)
Valley portion inclination angle: 31°
(Region B: region other than region A)
Substantially pentagonal shape (shape shown in FIG. 19)
Degree distribution of inclination angle absolute values:
30° or more and 50° or less - - - 85%
Valley portion inclination angle: 43°

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

Example 8

This example was performed in the same manner as in Example 1 except that, in order to constitute a liquid crystal display device having a distance of 2.8 mm from a light guide light incident end surface to an effective light emitting region, a necessary spread angle was set to 122°, a blasting process of a first mold was performed with respect to a region excluding a region of 2.0 mm from a side having a length of 34 mm while changing a blowing pressure in a range of 4 kgf/cm² to 6 kgf/cm², and a transfer pattern for forming an oblique elongated prism of an apex angle of 130° in a direction symmetrically inclined at 550 with respect to an X-direction was formed by etching in a region which was not subjected to the blasting process.

An average inclination angle of a light outputting surface of an obtained light guide except the oblique prism portion was 0° in a region of 2.0 mm from a light incident end surface, and 2.5° to 3.5° in the other region, and the middle portion of the effective light emitting region had a maximum value.

The cross-sectional shape of the elongated lens forming surface of the obtained light guide was as follows.

(Region A: region of 3.5 mm from light incident end surface)
Outward convex curved line
Degree distribution of inclination angle absolute values:
20° or more and 50° or less - - - 67%
25° or more and 50° or less - - - 51%
30° or more and 50° or less - - - 39%
35° or more and 50° or less - - - 26%
40° or more and 50° or less - - - 8%
15° or less - - - 33%
35° or more and 60° or less - - - 26%
40° or more and 60° or less - - - 8%
Maximum value of ratio of α° or more and α°+10' or less: 31% (α°=31°)
Valley portion inclination angle: 31°
(Region B: region other than region A)
Outward convex curved line
Degree distribution of inclination angle absolute values:
30° or more and 50° or less - - - 26%
Valley portion inclination angle: 12°

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

Example 9

This example was performed in the same manner as in Example 4 except that a shape of a shape transfer surface (concave curved surface) of a symmetrical lens pattern was changed.

An average inclination angle of a light outputting surface of an obtained light guide was 0° in a region of 5.0 mm from a light incident end surface, and 2.5° to 3.5° in the other region, and a middle portion of an effective light emitting region had a maximum value.

A cross-sectional shape of a elongated lens forming surface of the obtained light guide was as follows.
Outward convex curved line
Degree distribution of inclination angle absolute values:
20° or more and 50° or less - - - 22%
25° or more and 50° or less - - - 0%
30° or more and 50° or less - - - 0%
35° or more and 50° or less - - - 0%
40° or more and 50° or less - - - 0%
15° or less - - - 70%
35° or more and 60° or less - - - 0%
40° or more and 60° or less - - - 0%
Maximum value of ratio of α° or more and α°+10° or less: 40% (α°=10°)
Valley portion inclination angle: 23°

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

Example 10

This example was performed in the same manner as in Example 2 except that, in order to constitute a liquid crystal display device having a distance of 5.5 mm from a light guide light incident end surface to an effective light emitting region, a necessary spread angle was set to 85°, a shape of a shape transfer surface (concave curved surface) of a symmetrical lens pattern was changed, a blasting process of a first mold was performed with respect to a region excluding a region of 5.0 mm from a side having a length of 34 mm, and the blasting process of a second mold was not performed.

An average inclination angle of a light outputting surface of an obtained light guide was 0° in a region of 5.0 mm from a light incident end surface, and 2.5° to 3.5° in the other region, and a middle portion of the effective light emitting region had a maximum value.

A cross-sectional shape of a elongated lens forming surface of the obtained light guide was as follows.
Outward convex curved line
Degree distribution of inclination angle absolute values:
20° or more and 50° or less - - - 59%
25° or more and 50° or less - - - 39%
30° or more and 50° or less - - - 18%
35° or more and 50° or less - - - 11%
40° or more and 50° or less - - - 0%
15° or less - - - 40%
35° or more and 60° or less - - - 11%
40° or more and 60° or less - - - 0%
Maximum value of ratio of α° or more and α°+10' or less: 20% (α°=21°)
Valley portion inclination angle: 21°

All the primary light sources were turned on, the surface light source device was allowed to emit the light, and the brightness unevenness of the effective light emitting region was judged. Then, any of a dark part of FIG. 27, a streaked bright line of FIG. 29, a bright part by distribution overlap of light sources of FIG. 30, and a streaked bright line of FIG. 32 was not observed.

INDUSTRIAL APPLICABILITY

As described above, according to the present invention, brightness unevenness accompanying use of a small number of point primary light sources is eliminated for reduction of power consumption of a surface light source device, and a high-quality surface light source device can be provided.

The invention claimed is:

1. A light guide for a surface light source device having a plate-like shape that guides light emitted from a point primary light source, comprising:
   a light incident end surface to receive light from the primary light source;
   an elongated lens forming surface to spread light received from the light incident end surface, the elongated lens forming surface includes a plurality of elongated concave/convex structures arranged substantially in parallel to each other and extend substantially along a direction of directivity of light, wherein a plurality of micro regions defined over a specific number of the plurality of elongated concave/convex structures in cross section thereof, wherein a distribution of the micro regions having an inclination angle between 20° and 50° is more than 10% over all micro regions in the vicinity of the primary light source, such that the inclination angle is formed by a tangent to each micro region and is defined in an absolute value; and a light outputting surface to output the guided light having a light outputting functional structure.

2. The light guide for the surface light source device according to claim 1, wherein each of the elongated concave/convex structures is an elongated lens, and a plurality of repeatedly arranged elongated lenses having substantially the same shape form the elongated concave/convex structures.

3. The light guide for the surface light source device according to claim 1, wherein a part of the surface or an entire surface of each of the elongated concave/convex structures is roughened.

4. The light guide for the surface light source device according to claim 1, wherein for any inclination angle α° degrees in a range between 0° and 80°, a distribution of the micro regions having an inclination angle between α° and α°+10° is less than 60% over all the micro regions in the vicinity of the primary light source.

5. The light guide for the surface light source device according to claim 1, wherein a region A is defined in the vicinity of the primary light source on the elongated lens forming surface, and a region B is defined next to the region A in the direction away from the primary light source, such that a sectional shape of the region A is different from that of the region B.

6. The light guide for the surface light source device according to claim 5, wherein a distribution of the micro regions having an inclination angle between 30° and 50° is smaller in the region B than that of in the region A.

7. The light guide for the surface light source device according to claim 5, wherein the inclination angle formed in a valley portion of the elongated concave/convex structures in the region B is smaller than that in the region A.

8. The light guide for the surface light source device according to claim 5, wherein shape of the elongated concave/convex structures gradually changes from the region A to the region B.

9. The light guide for the surface light source device according to claim 5, wherein the region B is formed in an entire remaining portion of the elongated lens forming surface.

10. The light guide for the surface light source device according to claim 5, wherein substantially all of the elongated concave/convex structures formed on the elongated lens forming surface are provided in the region B.

11. The light guide for the surface light source device according to claim 5, wherein the region B is formed in a band shape.

12. The light guide for the surface light source device according to claim 5, wherein the region B is formed in an island shape.

13. The light guide for the surface light source device according to claim 1, wherein a distribution of the micro regions having an inclination angle between 35° and 60° is in a range between 4% and 55% over all the micro regions, or a distribution of the micro regions having an inclination angle less than 15° is in a range between 25% and 85% over all the micro regions in the vicinity of the primary light source.

14. The light guide for the surface light source device according to claim 1, wherein a shape of all or part of the elongated concave/convex structures include an outwardly convex curved line.

15. The light guide for the surface light source device according to claim 1, wherein a shape of all or part of the elongated concave/convex structures include an outwardly concave curved line.

16. The light guide for the surface light source device according to claim 1, wherein a shape of all or part of the elongated concave/convex structures include a curved line having an outwardly convex region and an outward concave region.

17. The light guide for the surface light source device according to claim 1, wherein a shape of all or part of the elongated concave/convex structures include a substantially polygonal shape.

18. The light guide for the surface light source device according to claim 1, wherein a shape of all or part of the elongated concave/convex structures have a shape where a straight line is combined with a curved line.

19. The light guide for the surface light source device according to claim 1, wherein a first region where the elongated concave/convex structures each having curved line shape are formed as first sectional shapes in the vicinity of the primary light source, and a second region where the elongated concave/convex structures each having substantially polygonal shapes are formed as second sectional shapes adjacent to the first region.

20. The light guide for the surface light source device according to claim 19, wherein a maximum value of a distribution of the micro regions having an inclination angle between α° and α°+10° with respect to all α° between 0° and 80° over all the micro regions is larger in the second region than that of in the first region.

21. The light guide for the surface light source device according to claim 1, wherein the plurality of elongated concave/convex structures is obtained by blasting a part or an entire transfer surface of a mold, and using the mold to form the elongated concave/convex structures.

22. The light guide for the surface light source device according to claim 1, wherein the plurality of elongated concave/convex structures is obtained by polishing a part or an entire transfer surface of a mold, and using the mold to form the elongated concave/convex structures.

23. The light guide for the surface light source device according to claim 1, wherein the plurality of elongated concave/convex structures is obtained by etching a part or an entire transfer surface of a mold, and using the mold to form the elongated concave/convex structures.

24. The light guide for the surface light source device according to claim 1, wherein a part or an entire surface of the elongated lens forming surface has a blast trace from a direct blasting process.

25. The light guide for the surface light source device according to claim 1, wherein the elongated lens forming surface is obtained by using a first mold having a first elongated concave/convex structure shape transfer surface to shape a material, the first transfer surface to shape a material, blasting a part or an entire transfer surface of the material, using a blasted material to shape a second mold having a second elongated concave/convex structure shape transfer surface, and using the second mold to form a plurality of elongated concave/convex structures on the elongated lens forming surface.

26. The light guide for the surface light source device according to claim 1, wherein the light incident end surface includes an anisotropic rough surface, and an average inclination angle of the anisotropic rough surface in a lengthwise direction of the light outputting surface is larger than that in a direction perpendicular to and away from the light outputting surface.

27. The light guide for the surface light source device according to claim 26, the average inclination angle in the lengthwise direction of the light outputting surface is 3° to 30°, and the average inclination angle in the direction perpendicular to and away from the light outputting surface is 5° or less.

28. The light guide for the surface light source device according to claim 26, a length of a region having an inclination angle of 8° or more in the lengthwise direction of an anisotropic rough surface is 5% or less of a total measured length.

29. The light guide for the surface light source device according to claim 26, surface of an elongated lens extending in a direction perpendicular to and away from the light outputting surface is roughened.

30. The light guide for the surface light source device according to claim 1, wherein the light outputting functional structure comprises a rough surface or a plurality of substantially mutually parallel elongated lenses, and the elongated lenses substantially extend in a direction of directivity of light that entered the light guide or a direction perpendicular to the direction of directivity of light.

31. The light guide for the surface light source device according to claim 30, wherein an average inclination angle of the plurality of elongated lenses is 0.2° to 20° in the direction of the directivity of the light that entered the light guide.

32. The light guide for the surface light source device according to claim 30, wherein the surfaces of the plurality of elongated lenses are roughened.

33. The light guide for the surface light source device according to claim 1, further comprising a component that functions as a light outputting functional structure and whose refractive index is different from that of a main component of the light guide.

34. The light guide for the surface light source device according to claim 1, wherein when a necessary light spread angle is 100° or more, a region where a distribution of the micro regions having an inclination angle between 30° and 50° is more than 10% over all the micro regions is formed substantially in all of a region from the light incident end surface to an effective light emitting region on the elongated lens forming surface.

35. The light guide for the surface light source device according to claim 1, wherein a necessary light spread angle is 90° or more and a region in which a proportion of the micro regions having an inclination angle between 25° and 50° is more than 20% over all the micro regions is formed in a part or all of a region from the light incident end surface to an effective light emitting region in the elongated concave/convex structure forming surface.

36. The light guide for the surface light source device according to claim 1, wherein a necessary light spread angle is 80° or more and a region in which a proportion of the micro regions having an inclination angle between 25° and 50° is more than 10% over all the micro regions is formed in a part or all of a region from the light incident end surface to an effective light emitting region in the elongated concave/convex structure forming surface.

37. The light guide for the surface light source device according to claim 1, wherein a necessary light spread angle is 70° or more and a region in which a proportion of the micro regions having an inclination angle between 20° and 50° is more than 10% over all the micro regions is formed in a part or all of a region from the light incident end surface to an effective light emitting region in the elongated concave/convex structure forming surface.

38. The light guide for the surface light source device according to claim 1, wherein a plurality of elongated lenses-extending in an oblique direction with respect to the direction of the directivity of light that entered the light guide are formed on the light outputting surface or the elongated lens forming surface in the vicinity of the light incident end surface.

39. The light guide for the surface light source device according to claim 38, wherein the obliquely elongated lenses extend in a direction inclined at an angle corresponding to a half of a necessary light spread angle with respect to the direction of the directivity of the light which has entered the light guide.

40. The light guide for the surface light source device according to claim 38, wherein in a shape of a section perpendicular to the extending direction of the obliquely elongated lenses, a plurality of micro regions defined over a specific number of the plurality of obliquely elongated lenses, and a proportion of the micro regions of obliquely elongated lenses having an inclination angle between 20° and 50° formed by a tangent of each micro region of obliquely elongated lenses with the obliquely elongated lens forming surface is more than 10% over all the micro regions of obliquely elongated lenses.

41. A surface light source device comprising:
a light guide for the surface light source device, according to claim 1;
the primary light source disposed adjacent to the light incident end surface of the light guide; and
at least one light deflection element disposed adjacent to a light outputting surface of the light guide, the light deflection element having a light entrance surface facing the light outputting surface of the light guide, and a light exit surface on an opposite side, wherein, a plurality of elongated lenses formed parallel to one another on the light entrance surface of the light deflection element that extend in a direction substantially parallel to the light incident end surface of the light guide.

42. The surface light source device according to claim 41, wherein each of the plurality of elongated lenses on the light entrance surface of the light deflection element comprises two faces, wherein light incident on one of the faces is totally reflected by the other face.

43. The surface light source device according to claim 41, wherein a light reflection element is disposed facing the back surface of the light guide.

44. The surface light source device according to claim 41, wherein the light incident end surface is formed in one end or one corner portion of the light guide.

45. The surface light source device according to claim 44, wherein a plurality of primary light sources are arranged adjacent to the one end or corner portion of the light guide in an interval, and a region where a distribution of the micro regions having an inclination angle between 30° and 50° is more than 10% over all the micro regions is disposed in the vicinity of the end of the light guide in such a manner that light coming from the adjacent primary light sources are superimposed over each other in the region.

46. The surface light source device according to claim 44, wherein a plurality of primary light sources are arranged in an interval adjacent to the one end or corner portion of the light guide, and an average inclination angle of a light outputting functional structure at a portion of the one end or corner portion of the light guide that directly faces the primary light source is different from a portion between the primary light sources.

47. The surface light source device according to claim 44, wherein a plurality of primary light sources are arranged in an interval adjacent to the one end or corner portion of the light guide, and when only one of the primary light sources is turned on, normal luminance is measured from the one primary light source at an interval of 1 mm in a lengthwise direction in a region defined at one edge of an effective light emitting region, such that a first side of the region is at 3 mm from the one edge of the effective light emitting region and a second side of the region is at 3.5 mm from the one edge of the effective light emitting region, a relation between a measurement position and the luminance is plotted and a half-value full-width distance obtained from the plot is in a range of 0.8 to 1.2 times with respect to a distance between the adjacent primary light sources.

* * * * *